(12) United States Patent
Takahashi et al.

(10) Patent No.: US 11,705,847 B2
(45) Date of Patent: Jul. 18, 2023

(54) DRIVE DEVICE FOR AC MOTOR, COMPRESSOR DRIVE DEVICE, AND REFRIGERATION CYCLE DEVICE

(71) Applicant: Mitsubishi Electric Corporation, Tokyo (JP)

(72) Inventors: Kenji Takahashi, Tokyo (JP); Yuki Taniyama, Tokyo (JP); Hiroyuki Kamiko, Tokyo (JP); Toshiyuki Kaitani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/772,551

(22) PCT Filed: Jan. 14, 2020

(86) PCT No.: PCT/JP2020/000909
§ 371 (c)(1),
(2) Date: Apr. 28, 2022

(87) PCT Pub. No.: WO2021/144856
PCT Pub. Date: Jul. 22, 2021

(65) Prior Publication Data
US 2022/0407444 A1 Dec. 22, 2022

(51) Int. Cl.
*H02P 23/14* (2006.01)
*F25B 31/02* (2006.01)

(52) U.S. Cl.
CPC .......... *H02P 23/14* (2013.01); *F25B 31/026* (2013.01)

(58) Field of Classification Search
CPC .. H02P 23/14; H02P 6/10; H02P 29/50; H02P 21/13; H02P 21/05; H02P 21/18; H02P 21/24; F25B 31/026; F25B 49/022

(Continued)

(56) References Cited

U.S. PATENT DOCUMENTS

| 7,449,859 B2 * | 11/2008 | Bae ........................ B60L 50/51 |
| | | 318/807 |
| 2019/0145668 A1 | 5/2019 | Takahashi et al. |

FOREIGN PATENT DOCUMENTS

| JP | 1-308184 A | 12/1989 |
| WO | 2017/212794 A1 | 12/2017 |
| WO | 2020/194401 A1 | 10/2020 |

OTHER PUBLICATIONS

International Search Report and Written Opinion dated Mar. 17, 2020, received for PCT Application PCT/JP2020/000909, Filed on Jan. 14, 2020, 8 pages including English Translation.

(Continued)

*Primary Examiner* — David Luo
(74) *Attorney, Agent, or Firm* — Xsensus LLP

(57) ABSTRACT

A drive device for an AC motor includes: an adaptive observation unit that adaptively estimates an angular velocity of a rotor of an AC motor; a speed control unit that determines a first torque command with which an angular velocity command matches an average value of an estimated angular velocity; a phase lead amount calculation unit that calculates, based on a disturbance frequency, a phase lead amount of a transfer function from a true angular velocity to a model deviation; a vibration suppression control unit that determines, based on a frequency of load torque pulsations, the model deviation, and the phase lead amount, a second torque command with which speed pulsations in the AC motor are suppressed; and a torque control unit that controls a torque of the AC motor based on the first torque command and the second torque command.

18 Claims, 14 Drawing Sheets

(58) Field of Classification Search
USPC .................................................. 318/445, 34
See application file for complete search history.

(56) References Cited

OTHER PUBLICATIONS

Kinpara et al., "Speed Sensorless Vector Control Method of Induction Motor Including Low Speed and Regeneration Region", IEEJ Journal D, vol. 120, No. 2, 2000, pp. 223-229 (7 pages including English Abstract).

* cited by examiner

DRIVE DEVICE FOR AC MOTOR, COMPRESSOR DRIVE DEVICE, AND REFRIGERATION CYCLE DEVICE

CROSS-REFERENCE TO RELATED APPLICATION

The present application is based on PCT filing PCT/JP2020/000909, filed Jan. 14, 2020, the entire contents of which is incorporated herein by reference.

FIELD

The present disclosure relates to a drive device for an AC motor (hereinafter may be abbreviated as a "drive device") that drives an AC motor such as an induction machine or a synchronous machine, and to a compressor drive device and a refrigeration cycle device including the compressor drive device.

BACKGROUND

In the control of an AC motor, when the load torque or the generated torque of the AC motor pulsates, the rotational speed of the AC motor also undergoes pulsations. Pulsations in the rotational speed of the AC motor cause vibrations in the device equipped with the AC motor, which may cause problems of noise generation, mechanical strength, and the like. In order to cope with these problems, control for reducing torque pulsations and speed pulsations has been studied.

For example, Patent Literature 1 below discloses a method for implementing control for reducing torque pulsations and speed pulsations in a sensorless manner without using a position sensor or a speed sensor so that cost reduction can be achieved or the control can be applied to a device to which it is difficult to attach a sensor.

In general position sensorless control, the speed estimation response has an upper limit of several hundred [rad/s]. For this reason, in general position sensorless control, the response to high-frequency pulsations is insufficient, and it is difficult to accurately estimate the pulsations. As a technique for coping with this problem, Patent Literature 1 discloses a technique for enhancing the speed estimation response at an arbitrary frequency to accurately estimate speed pulsations and suppress high-frequency vibrations by providing two angular velocity estimation units connected in parallel.

Note that Patent Literature 2 and Non Patent Literature 1 below are prior art documents related to the technique of the present disclosure. The contents of these documents are referred to in the section of "Description of Embodiments".

CITATION LIST

Patent Literature

Patent Literature 1: PCT Patent Application Laid-open No. 2017/212794
Patent Literature 2: Japanese Patent Application Laid-open No. H1-308184

Non Patent Literature

Non Patent Literature 1: Kinpara and Koyama, "Speed Sensorless Vector Control Method of Induction Motor Including Low Speed and Regeneration Region", IEEJ Journal D, Vol. 120, No. 2, pp. 223-229, 2000

SUMMARY

Technical Problem

In a case where an AC motor is driven by position sensorless control, any change in the method of position estimation or speed estimation exerts a wide range of influences. Therefore, in the event that the position estimation calculation unit or the speed estimation calculation unit is changed, it is necessary to investigate closely whether any trouble is likely to occur in the drive device due to the change.

In the case of adding the method of Patent Literature 1 to an existing drive device for an AC motor as an extended function, the better the market performance of the drive device, the more man-hours that are required to conduct reliability evaluation associated with the functional addition. Therefore, the technique of Patent Literature 1 is difficult to implement in some cases. In particular, it is extremely difficult to implement the technique of Patent Literature 1 in general-purpose drive devices.

The present disclosure has been made in view of the above, and an object thereof is to provide a drive device for an AC motor based on sensorless control in which an extended function to be added to the existing functionality can be easily implemented.

Solution to Problem

In order to solve the above-described problems and achieve the object, a drive device for an AC motor according to the present disclosure includes an adaptive observation unit, a speed control unit, a phase lead amount calculation unit, a vibration suppression control unit, and a torque control unit. The adaptive observation unit adaptively estimates an angular velocity of a rotor of an AC motor that drives a mechanical device having periodic load torque pulsations. The speed control unit determines a first torque command with which an angular velocity command matches an average value of an estimated angular velocity. The phase lead amount calculation unit calculates, based on a disturbance frequency, a phase lead amount of a transfer function from a true angular velocity to a model deviation that is an internal quantity of the adaptive observation unit. The vibration suppression control unit determines, based on a frequency of the load torque pulsations, the model deviation, and the phase lead amount, a second torque command with which speed pulsations in the AC motor are suppressed. The torque control unit controls a torque of the AC motor based on the first torque command and the second torque command.

Advantageous Effects of Invention

The drive device for an AC motor according to the present disclosure achieves the effect that an extended function to be added to the existing functionality can be easily implemented.

DESCRIPTION OF EMBODIMENTS

Hereinafter, a drive device for an AC motor, a compressor drive device, and a refrigeration cycle device according to embodiments of the present disclosure will be described in detail with reference to the accompanying drawings.

First Embodiment

Figure 1:
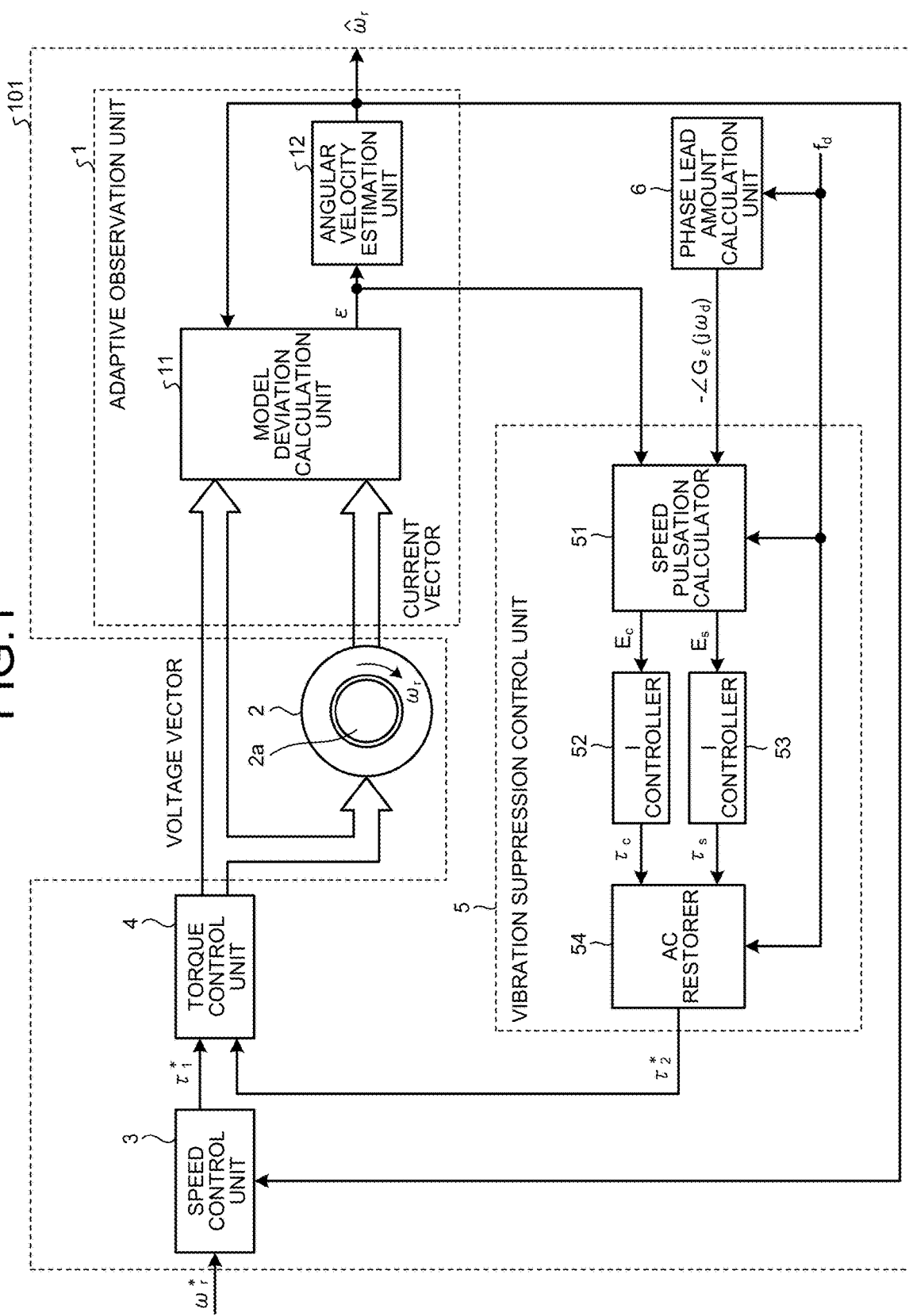
FIG. 1 is a block diagram illustrating a configuration of a drive device for an AC motor according to a first embodiment.

FIG. 1 is a block diagram illustrating a configuration of a drive device 101 for an AC motor according to the first embodiment. The drive device 101 according to the first embodiment illustrated in FIG. 1 is a drive device that estimates an angular velocity $\omega_r$, i.e. the angular velocity of a rotor 2a of an AC motor 2, and drives the AC motor 2 such that the angular velocity estimated, or an estimated angular velocity $\hat{\omega}_r$, matches an angular velocity command $\omega^*_r$.

The drive device 101 includes an adaptive observation unit 1, a speed control unit 3, a torque control unit 4, a vibration suppression control unit 5, and a phase lead amount calculation unit 6.

The adaptive observation unit 1 is a component that adaptively estimates the angular velocity of the AC motor 2.

Specifically, the adaptive observation unit 1 estimates the angular velocity $\omega_r$ of the AC motor 2 using the voltage vector applied to the AC motor 2 and the current vector flowing through the AC motor 2 based on the principle of adaptive observers. The AC motor 2 is the power source of a mechanical device (not illustrated). The mechanical device applies periodic load torque pulsations to the AC motor 2 in synchronization with the rotation of the AC motor 2.

The adaptive observation unit 1 includes a model deviation calculation unit 11 and an angular velocity estimation unit 12. The model deviation calculation unit 11 calculates a model deviation a based on the voltage vector, the current vector, and the estimated angular velocity $\hat{\omega}_r$. The model deviation ε is an internal quantity of the adaptive observation unit 1. The angular velocity estimation unit 12 calculates the estimated angular velocity $\hat{\omega}_r$ based on the model deviation ε.

Inside the model deviation calculation unit 11, calculation processing for estimating state quantities of the AC motor 2 is performed based on the equation of state of the AC motor 2. The state quantities are exemplified by current and magnetic flux. In this description, the AC motor 2 is assumed to be a general interior permanent magnet synchronous motor, which is only an example. The model deviation calculation unit 11 may be a different type of AC motor for which an equation of state similar to the equation of state described below can be established. A different type of AC motor can be a surface permanent magnet synchronous motor, an induction motor, or the like. For convenience of explanation, this description is based on the assumption that each electric motor is a three-phase motor, which is only an example. Each electric motor may be an electric motor having a different number of phases, such as a two-phase motor or a five-phase motor.

For sensorless drive of the interior permanent magnet synchronous motor, the equation of state used in the adaptive observation unit 1 is expressed by Formula (1) below. In addition, the output equation used in the adaptive observation unit 1 is expressed by Formula (2) below.

[Formula 1]

$$\frac{d}{dt}\begin{bmatrix}\hat{\phi}_{ds}\\\hat{\phi}_{qs}\\\hat{\phi}_{dr}\end{bmatrix} = \begin{pmatrix}-\frac{R_a}{L_d} & \omega_1 & 0\\-\omega_1 & -\frac{R_a}{L_q} & -\hat{\omega}_r\\0 & 0 & 0\end{pmatrix}\begin{bmatrix}\hat{\phi}_{ds}\\\hat{\phi}_{qs}\\\hat{\phi}_{dr}\end{bmatrix} + \begin{bmatrix}v_d\\v_q\\0\end{bmatrix} - \begin{bmatrix}h_{11} & h_{12}\\h_{21} & h_{22}\\h_{31} & h_{32}\end{bmatrix}\begin{bmatrix}\hat{i}_d - i_d\\\hat{i}_q - i_q\end{bmatrix} \quad (1)$$

[Formula 2]

$$\begin{bmatrix}\hat{i}_d\\\hat{i}_q\end{bmatrix} = \begin{bmatrix}1/L_d & 0 & 0\\0 & 1/L_q & 0\end{bmatrix}\begin{bmatrix}\hat{\phi}_{ds}\\\hat{\phi}_{qs}\\\hat{\phi}_{dr}\end{bmatrix} \quad (2)$$

In Formulas (1) and (2), $L_d$ and $L_q$ respectively represent the d-axis and q-axis inductances, and $R_a$ represents the armature resistance. In addition, $\omega_r$ represents the electrical angular velocity of the AC motor 2, and $\omega_1$ represents the primary angular frequency. In addition, $v_d$ represents the d-axis voltage, and $v_q$ represents the q-axis voltage. In addition, $i_d$ represents the d-axis current, and $i_q$ represents the q-axis current. In addition, $\varphi_{ds}$ represents the d-axis stator magnetic flux, $\mu_{qs}$ represents the q-axis stator magnetic flux, and $\varphi_{dr}$ represents the d-axis rotor magnetic flux. In addition, $h_{11}$ to $h_{32}$ represent observer gains. The symbol "^" represents an estimated value.

The primary angular frequency $\omega_1$, which appears in Formula (1), is given as Formula (3) below.

[Formula 3]

$$\omega_1 = \hat{\omega}_r - \frac{h_{41}(\hat{i}_d - i_d) + h_{42}(\hat{i}_q - i_q)}{\hat{\phi}_{dr}} \quad (3)$$

In Formula (3), $h_{41}$ and $h_{42}$ represent observer gains, like $h_{11}$ to $h_{32}$ described above.

Note that Formula (1) indicates an example in which the dq-axis magnetic flux of the stator and the dq-axis magnetic flux of the rotor are selected as the state quantities, but different physical quantities may be selected as the state quantities. For example, Formula (1) may be modified such that the current is used for calculation instead of the stator magnetic flux. Alternatively, instead of the rotor magnetic flux, the extended induced voltage may be used for calculation. As the coordinate system, a different coordinate system may be adopted instead of the dq coordinate system. For example, a stationary $\alpha\beta$ coordinate system may be adopted instead of the dq coordinate system.

Because Formula (1) includes the estimated angular velocity $\hat{\omega}_r$, an error occurs in current estimation when the estimated angular velocity $\hat{\omega}_r$ does not match the actual angular velocity $\omega_r$. Here, the model deviation $\varepsilon$ is defined as Formula (4) below. The adaptive observation unit 1 adjusts the value of the estimated angular velocity $\hat{\omega}_r$ using the angular velocity estimation unit 12 such that the model deviation $\varepsilon$ becomes zero.

[Formula 4]

$$\varepsilon = \frac{i_q - \hat{i}_q}{\hat{\phi}_{dr}} \quad (4)$$

Known examples of the specific configuration of the angular velocity estimation unit 12 include a case in which a proportional integral (PI) controller is used and a case in which a PI controller and an integrator are connected in series. Another known example is a case in which a second angular velocity estimation unit is provided in parallel with the angular velocity estimation unit 12 in FIG. 1, as described in Patent Literature 1. Nevertheless, the drive device 101 according to the present disclosure is intended to solve the problem of Patent Literature 1, namely increased man-hours for reliability evaluation, and thus does not adopt the method disclosed in Patent Literature 1, that is, the configuration in which the angular velocity estimation units are provided in parallel.

The adaptive observation unit 1 calculates the primary angular frequency based on the estimated magnetic flux vector, the estimated current vector, and the estimated angular velocity $\hat{\omega}_r$ using Formula (3). In addition, the adaptive observation unit 1 estimates the magnetic pole position, i.e. the rotor position, by integrating the primary angular frequency.

The above-described method of estimating the angular velocity and the rotor position in the AC motor 2 is generally called an "adaptive observer". In particular, when the state quantity in Formula (1) is magnetic flux, the adaptive observer is called an "adaptive magnetic flux observer". The adaptive magnetic flux observer is advantageous in being robust against fluctuations in the number of interlinkage magnetic fluxes and not producing steady speed estimation errors. Thus, the adaptive magnetic flux observer is recognized by those skilled in the art as a high-performance speed estimation method.

In the adaptive observation unit 1, it is possible to set the response speed of magnetic flux estimation and speed estimation to an arbitrary value by adjusting the observer gains $h_{11}$ to $h_{42}$ and the control gain of the angular velocity estimation unit 12. This is one of the most important properties in observer theory. In the drive device for an AC motor according to the present disclosure, vibration suppression control is performed using this property, details of which will be described later.

Next, the operation of the speed control unit 3 and the torque control unit 4 will be described. The speed control unit 3 calculates a first torque command $\tau^*_1$ based on the angular velocity command $\omega^*_r$ and the estimated angular velocity $\hat{\omega}_r$. Specifically, the speed control unit 3 determines the first torque command $\tau^*_1$ with which the angular velocity command $\omega^*_r$ matches an average value of the estimated angular velocity $\hat{\omega}_r$.

For the calculation of the first torque command $\tau^*_1$, speed control with a general proportional integral differential (PID) controller can be applied. However, any type of controller other than the PID controller may be used as long as desired control performance can be obtained. In addition, the PID controller and another type of controller may be used in combination. For example, a feedforward controller may be connected in parallel with the PID controller to form a two-degree-of-freedom control system.

The torque control unit 4 incorporates therein a dq-axis current control unit (not illustrated), a coordinate conversion unit (not illustrated), and a voltage application unit (not illustrated in FIG. 1). The torque control unit 4 determines a dq-axis current command based on the first torque command $\tau^*_1$ and a second torque command $\tau^*_2$. Specifically, control is performed such that the output torque of the AC motor 2 matches the sum of the first torque command $\tau^*_1$ and the second torque command $\tau^*_2$. Note that the method of determining the second torque command $\tau^*_2$ will be described later. The dq-axis current control unit (not illustrated) adjusts the voltage vector such that the dq-axis current command matches the dq-axis current, and applies the voltage vector to the AC motor 2 by means of the voltage application unit (not illustrated). The voltage and the current of the AC motor 2 are AC signals, and thus are appropriately converted into dq-coordinate DC signals by means of the coordinate conversion unit (not illustrated) for use in control.

Control of the dq-axis current is known as a suitable approach to control the torque of the AC motor 2 to a desired value. Needless to say, however, control may be performed using some coordinate system other than the dq coordinate system. In the case of a general interior permanent magnet synchronous motor, a motor torque $\tau_m$ is determined by Formula (5) below.

[Formula 5]

$$\tau_m = P_m \Phi_a i_q + P_m (L_d - L_q) i_d i_q \quad (5)$$

In Formula (5), $P_m$ represents the number of pole pairs of the AC motor 2, and $\varphi_a$ represents the number of interlinkage magnetic fluxes in the dq axes.

The dq-axis current is determined based on Formula (5) so as to output a desired torque. Here, the second term on the right side of Formula (5) is a term representing the reluctance torque. Therefore, when the reluctance torque is negligible, the motor torque $\tau_m$ and the q-axis current $i_q$ are in a proportional relationship. Therefore, a desired torque can be output by increasing or reducing the q-axis current $i_q$ according to the torque command.

For the control of the dq-axis current, a general PI controller can be used. However, the PI controller is typically used in combination with a decoupling controller in order to cancel the interference between the dq axes. Therefore, a preferable embodiment is to determine the voltage vector with which the dq-axis current command matches the dq-axis current using a controller including a decoupling controller.

The voltage application unit applies a voltage to the AC motor 2 based on the result of the dq-axis current control, and drives the AC motor 2. The voltage application unit is exemplified by, but not limited to, a general two-level inverter. Any circuit configuration may be used as long as a desired voltage can be applied. The voltage application unit may be, for example, a multi-level inverter or a matrix converter.

Next, the vibration suppression control unit 5 and the phase lead amount calculation unit 6, which are the main parts of the drive device 101 according to the present disclosure, will be described. Before describing vibration suppression control in the present disclosure, a typical vibration suppression control technique will be described.

As described above, the AC motor 2 is the power source of some mechanical device. Many mechanical devices have periodic load torque pulsations synchronized with the rotation of the AC motor 2, and add the load torque pulsations to the AC motor 2. The load torque pulsations cause speed pulsations in the AC motor 2. For this reason, the problem of vibration or noise can occur in some cases.

Torque ripple generated in the AC motor 2 can also cause vibration or noise. The torque ripple is the same type of disturbance as the load torque pulsations applied to the AC motor 2, from the viewpoint of the controller side. Therefore, the torque ripple generated in the AC motor 2 can result in speed pulsations in some cases. The periodic torque ripple generated in the AC motor 2 can be due to various causes such as harmonic distortion of the magnetic flux of the magnet and gain imbalance of the current sensor.

If the control response and the disturbance suppression response of the speed control unit 3 are sufficiently high with respect to the frequency of speed pulsations, speed pulsations do not become so large. However, the control response and the disturbance suppression response of the speed control unit 3 generally have an upper limit. In order to suppress high-frequency speed pulsations only with the speed control unit 3, it is necessary to set a very large control gain, whereas too large a control gain makes the control system unstable.

Under such circumstances, various vibration suppression control methods have been studied for a long time in order to accurately suppress high-frequency speed pulsations. A famous example is a method using Fourier series expansion and integral control such as that described in Patent Literature 2.

When it is possible to use a position sensor and the disturbance frequency is known, vibration suppression control is not so difficult to perform. On the other hand, in the case of position sensorless control, vibration suppression control is significantly difficult to perform. This is because the speed estimation response in a general position sensorless control system has an upper limit of at most about several hundred [rad/s] as described above, with which it is difficult to accurately estimate high-frequency speed pulsations. The technique described in Patent Literature 1 has been disclosed to solve this problem. In Patent Literature 1, the improved angular velocity estimation units enable accurate estimation of high-frequency speed pulsations. However, there is a case in which the technique described in Patent Literature 1 is difficult to apply.

In general, in the event that calculation processing that is performed inside the drive device is changed, it is necessary to investigate closely whether any trouble is likely to occur in the drive device due to the change. However, in the position sensorless control of the AC motor, a change in the angular velocity estimation unit causes a great change in performance, and thus can exert a wide range of influences. In the case of adding the method of Patent Literature 1 as an extended function to the existing functionality, the better the market performance of the drive device, the more man-hours that are required for reliability evaluation associated with the addition of the extended function. In such a case, it is extremely difficult to implement the technique of Patent Literature 1.

As a matter of fact, with the conventional technique described in Patent Literature 1, it is possible to suppress high-frequency speed pulsations in position sensorless control, but it is not possible to sufficiently prevent an increase in man-hours for reliability evaluation associated with the addition of the extended function. In order to reduce man-hours for reliability evaluation associated with the addition of the extended function, it is important not to change the configuration of the adaptive observation unit 1 that is the angular velocity estimation unit.

The drive device 101 according to the present disclosure has been devised under the above circumstances, so as to implement high-frequency vibration suppression control using the adaptive observation unit 1 having a typical configuration. Specifically, in the drive device 101 according to the present disclosure, the vibration suppression control unit 5 determines the second torque command $\tau^*_2$ with which speed pulsations in the AC motor 2 are suppressed based on two types of information: the model deviation of the adaptive observation unit 1 and the phase lead amount output by the phase lead amount calculation unit 6. In addition, the phase lead amount calculation unit 6 calculates the phase lead amount based on a disturbance frequency $f_d$. The phase lead amount calculation unit 6 is an essential component in the drive device 101 according to the present disclosure, and will be described in more detail later.

In the first embodiment, the disturbance frequency $f_d$ is treated as known. The disturbance frequency $f_d$ may be obtained using any method. For example, in a system that undergoes disturbance of a specific frequency, the disturbance frequency $f_d$ can be given in advance as a constant. Alternatively, in an application such as a compressor that undergoes disturbance that depends on the rotation frequency, the rotation frequency can be used as the disturbance frequency $f_d$. This rotation frequency can be acquired by a rotational position sensor or a speed sensor. In addition, in the case of the position sensorless control common to all the embodiments of this description, the rotation frequency can be obtained from the estimated angular velocity $\hat{\omega}_r$. Moreover, the frequency of torque pulsations may be detected or estimated by a torque meter, an acceleration sensor, or a vibration sensor for use as the disturbance frequency $f_d$.

How to acquire pulsation information such as position, speed, acceleration, and torque varies from document to document. Many of the conventional vibration suppression control techniques represented by Patent Literature 1 and Patent Literature 2 are based on the implicit precondition that such pulsation information can be acquired without a phase delay. On the other hand, this description considers a case where acquired data includes some phase delay. If the degree of the phase delay is known in advance, the influence of the phase delay can be avoided by advancing the phase of the acquired data by that amount. In contrast, the phase lead amount calculation unit 6 according to the present disclosure is configured to calculate how much the phase of the acquired data should be advanced.

Figure 2:
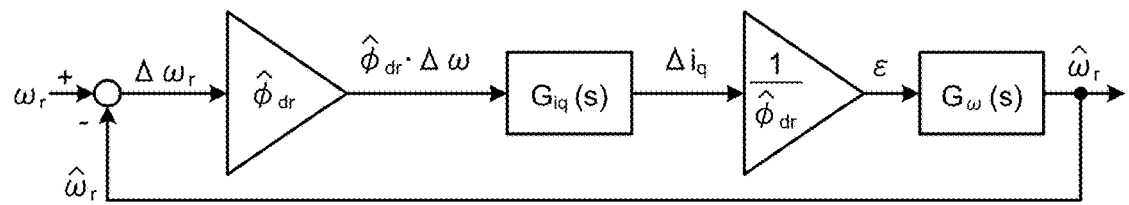
FIG. 2 is a block diagram illustrating the relationship between a model deviation and a speed estimation error in the drive device illustrated in FIG. 1.
Figure 3:
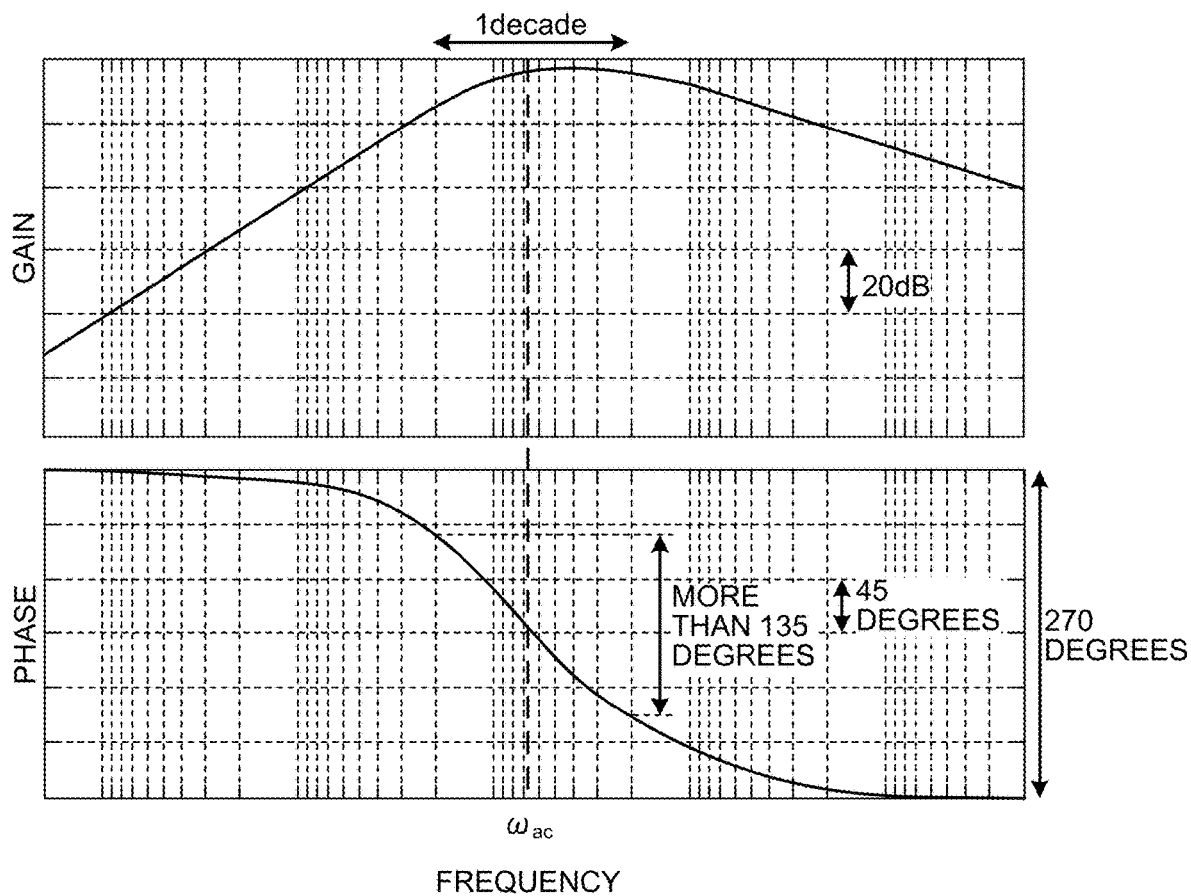
FIG. 3 is a diagram illustrating an example of the Bode plot of a transfer function from a true rotational angular velocity to the model deviation in the drive device illustrated in FIG. 1.
Figure 4:
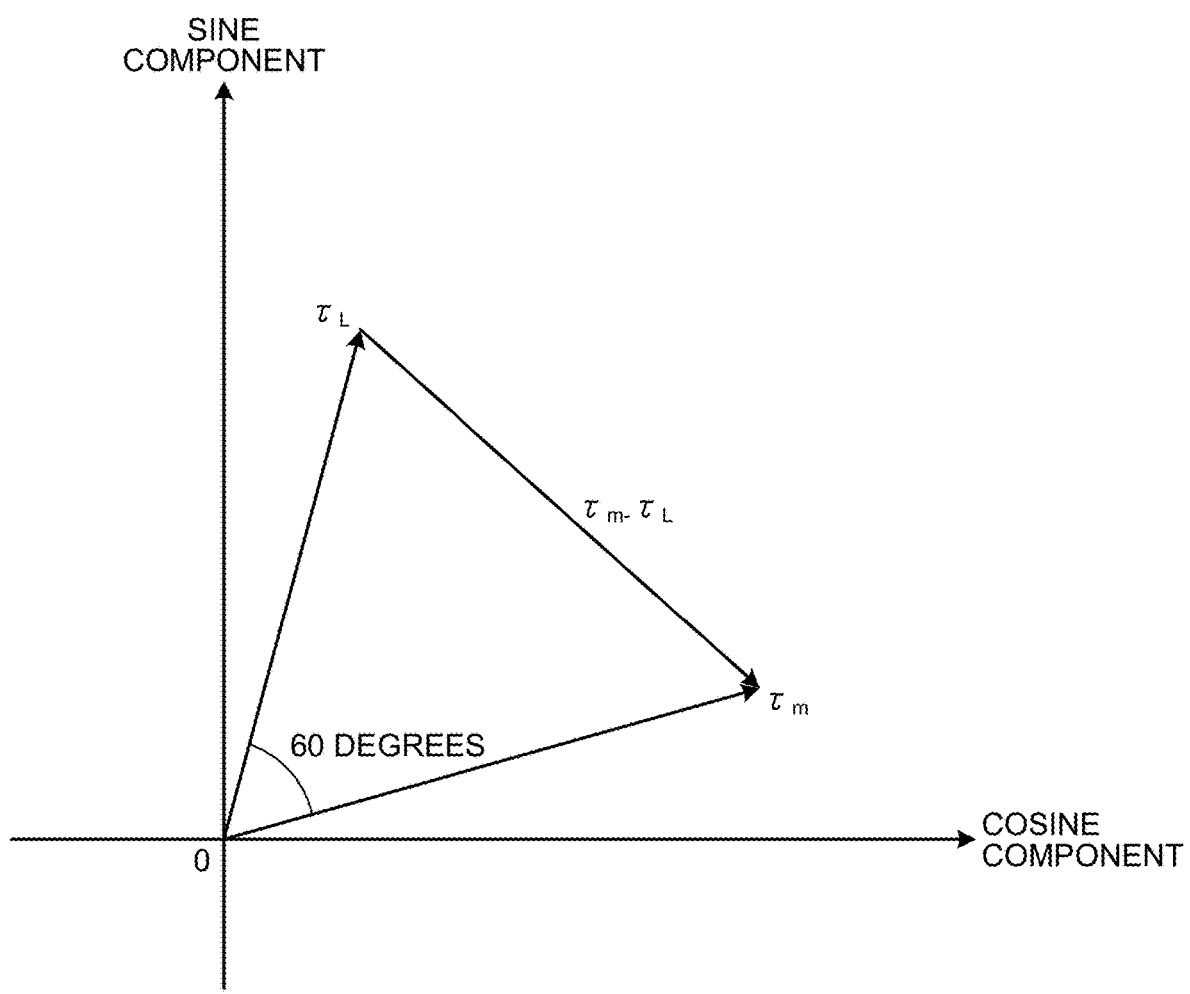
FIG. 4 is a vector diagram for explaining the necessity of the phase lead amount in the drive device illustrated in FIG. 1.
Figure 5:
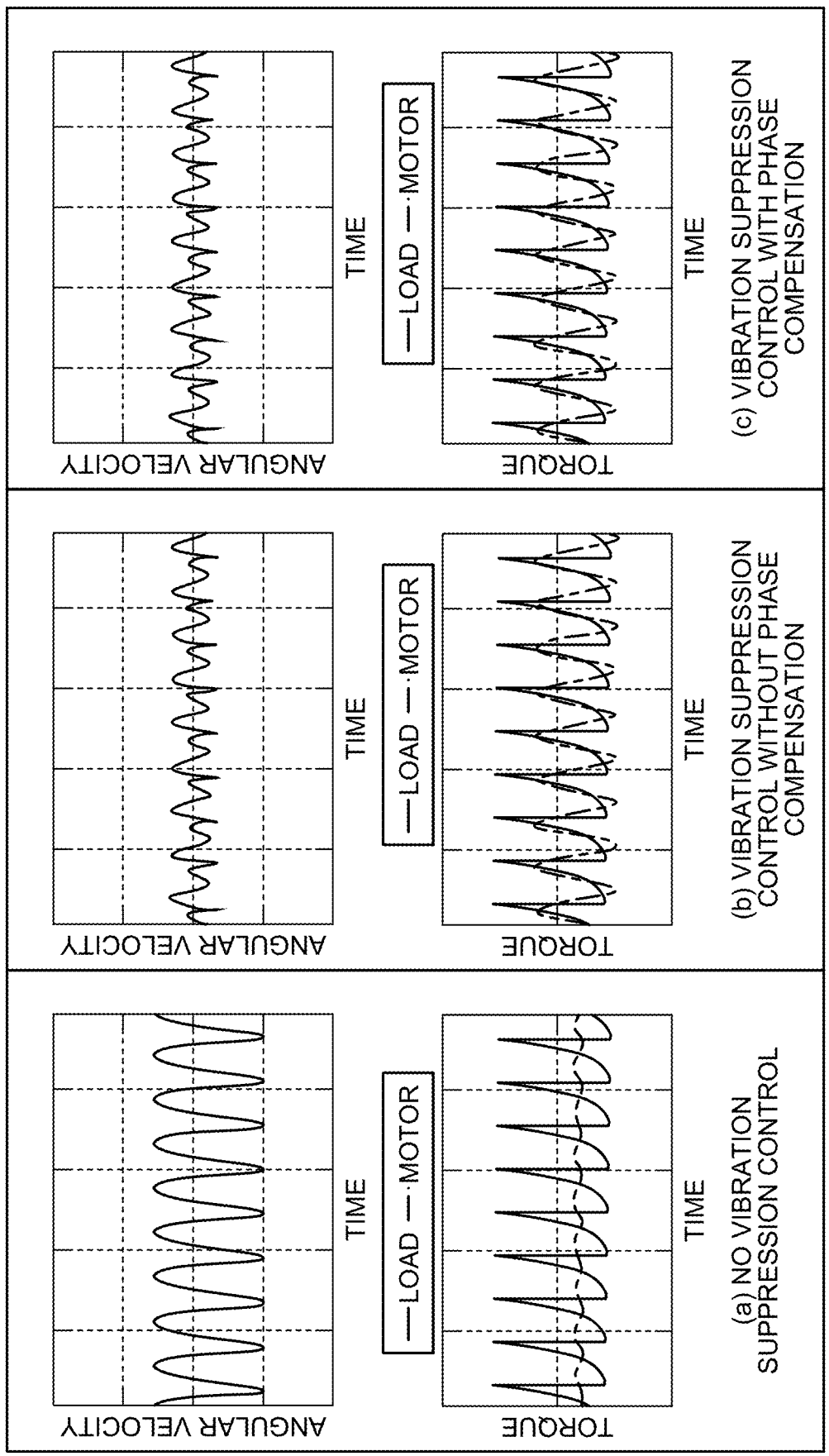
FIG. 5 is a first diagram for explaining the operation of the drive device according to the first embodiment.
Figure 6:
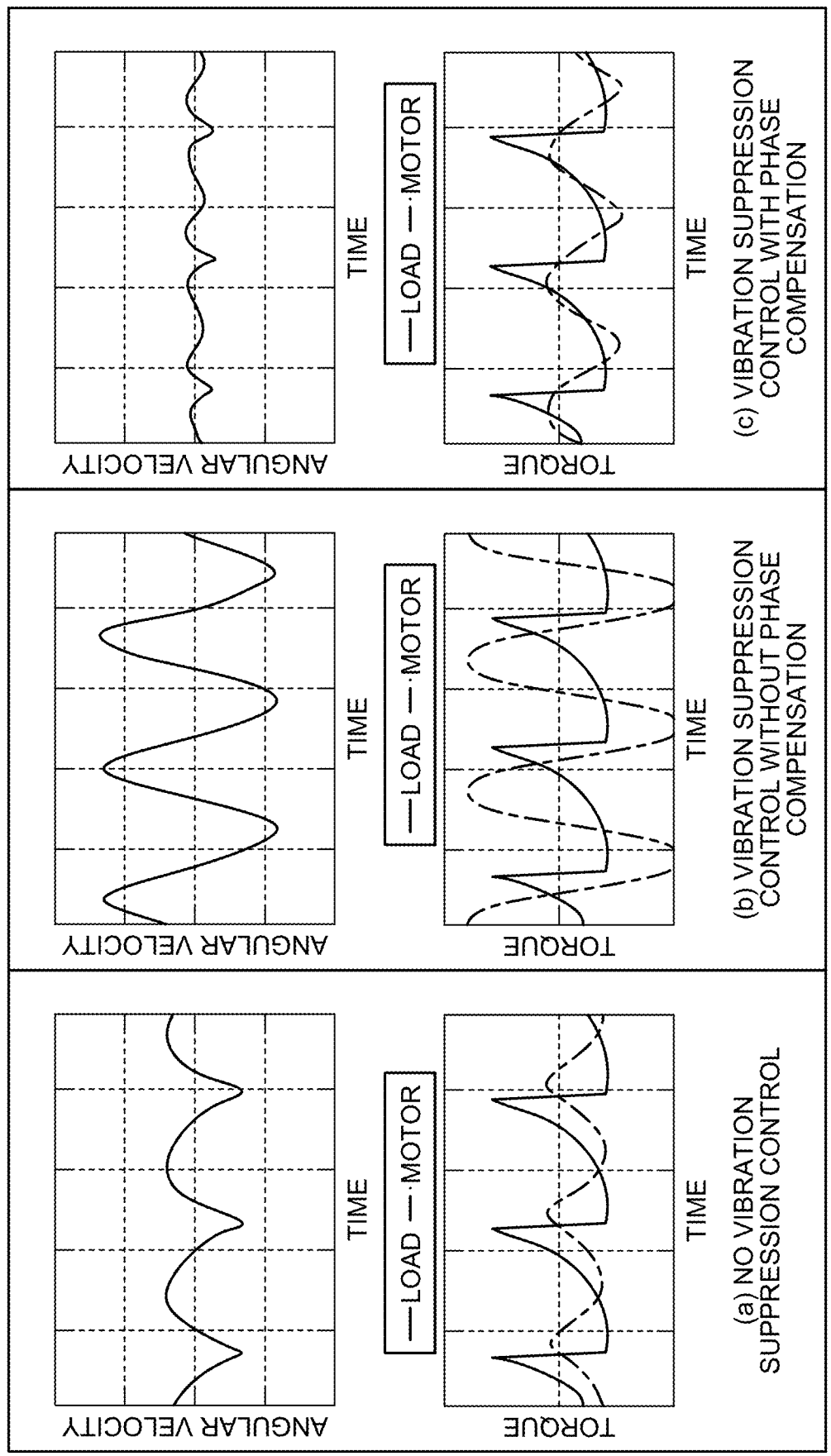
FIG. 6 is a second diagram for explaining the operation waveforms of the drive device according to the first embodiment.

Next, the configuration and operation of the main parts of the drive device 101 according to the first embodiment will be described with reference to FIGS. 2 to 6. FIG. 2 is a block diagram illustrating the relationship between the model deviation ε and a speed estimation error Δω in the drive device 101 illustrated in FIG. 1. FIG. 3 is a diagram illustrating an example of the Bode plot of a transfer function $G_\varepsilon(s)$ from the true angular velocity $\omega_r$ to the model deviation ε in the drive device 101 illustrated in FIG. 1. FIG. 4 is a vector diagram for explaining the necessity of the phase lead amount in the drive device 101 illustrated in FIG. 1. FIG. 5 is a first diagram for explaining the operation of the drive device 101 according to the first embodiment. FIG. 6 is a second diagram for explaining the operation waveforms of the drive device 101 according to the first embodiment.

First, what kind of phase delay is included in pulsation data that can be acquired in position sensorless control will be described. As described above, the adaptive observation unit 1 estimates the angular velocity $\omega_r$ of the AC motor 2 based on the voltage vector and the current vector. However, due to the upper limit of the estimation response, the information of high-frequency speed pulsations is lost in the estimated angular velocity $\hat{\omega}_r$. On the other hand, the information of high-frequency speed pulsations can be obtained from the internal data of the adaptive observation unit 1 by focusing on the model deviation ε. However, the model deviation ε has a phase delay with respect to the true angular velocity $\omega_r$ of the AC motor 2. The relationship between the model deviation ε and the speed estimation error $\Delta\omega=\omega_r-\hat{\omega}_r$ is known in Non Patent Literature 1 and elsewhere.

FIG. 2 is a block diagram illustrating the relationship between the model deviation ε and the speed estimation error Δω. In FIG. 2, $G_\omega(s)$ represents the transfer function of the angular velocity estimation unit 12. As described above, known examples of the specific configuration of the angular velocity estimation unit 12 include a case in which a PI controller is used and a case in which a PI controller and an integrator are connected in series. In FIG. 2, $G_{iq}(s)$ represents a transfer function for estimating a q-axis current estimation error $\Delta i_q$ from $\varphi_{dr}\cdot\Delta\omega$, i.e. the product of the d-axis rotor magnetic flux $\omega_{dr}$ and the speed estimation error Δω. Here, the transfer function $G_{iq}(s)$ is known to be expressed as a first-order low-pass filter as in Formula (6) below by appropriately determining the observer gains $h_{11}$ to $h_{42}$.

[Formula 6]

$$G_{iq}(s) = \frac{A_x}{1+sT_x} \quad (6)$$

In Formula (6), $A_x$ represents the gain coefficient of the low-pass filter, $T_x$ represents the time constant of the low-pass filter, and s represents the Laplace transform operator.

Note that the time constant $T_x$ can be changed by appropriately adjusting the observer gains $h_{11}$ to $h_{42}$.

In FIG. 2, the transfer function $G_\varepsilon(s)$ from the true angular velocity $\omega_r$ to the model deviation ε is expressed by Formula (7) below.

[Formula 7]

$$G_\varepsilon(s) = \frac{G_{iq}(s)}{1+G_{iq}(s)G_\omega(s)} \quad (7)$$

Here, the transfer functions $G_{iq}(s)$ and $G_\omega(s)$ are known by the control designer. Therefore, the characteristics of the transfer function $G_\varepsilon(s)$ are calculatable. FIG. 3 depicts an exemplary Bode plot representing the characteristics of the transfer function $G_\varepsilon(s)$ described above. Here, $\omega_{ac}$ on the horizontal axis in FIG. 3 is the speed estimation response of the observer. The speed estimation response is a numerically expressed speed at which the estimated angular velocity $\hat{\omega}_r$ follows a step change in the true angular velocity $\omega_r$. Specifically, the speed estimation response is the reciprocal of the time constant with respect to the step response. The larger the numerical value representing the speed estimation response, that is, the faster the speed estimation response, the better the control performance of the position sensorless control system. However, as described above, the speed estimation response has a limit of at most about several hundred [rad/s].

The example in FIG. 3 shows that the gain of the transfer function $G_\varepsilon(s)$ increases at about 40 [dB/decade] until a point near the speed estimation response $\omega_{ac}$, reaches a peak soon after the speed estimation response $\omega_{ac}$, and decreases at about −20 [dB/decade] thereafter. On the other hand, the phase characteristic of the transfer function $G_\varepsilon(s)$ has a phase change of about 270 degrees between the point of the minimum frequency and the point of the maximum frequency. In particular, at 1 [decade] around the speed estimation response $\omega_{ac}$, the phase changes significantly: the phase changes by more than 135 degrees as the frequency increases 10 times.

In a case where the model deviation ε is used instead of the true angular velocity $\omega_r$ as the input of vibration suppression control, the above-described phase change is a major problem that affects the success or failure of vibration suppression control. This is because, in general, vibration suppression control works negatively when the phase difference between the motor torque $\tau_m$ and a load torque $\tau_L$ exceeds ±60 degrees.

It is easy to imagine that vibration suppression control fails unless the phase of vibration information is accurately captured. Thus, in the drive device 101 according to the first embodiment, the phase lead amount calculation unit 6 is provided. The phase lead amount calculation unit 6 calculates the phase lead amount of the transfer function $G_\varepsilon(s)$ based on the disturbance frequency $f_d$. Specifically, the phase lead amount calculation unit 6 is configured to perform vibration suppression control by calculating the phase lead amount from the disturbance frequency $f_d$ and correcting the phase change in the transfer function $G_\varepsilon(s)$.

Next, the reason why the phase lead amount calculation unit 6 is required will be described. First, the load torque $\tau_L$ can be expressed by a trigonometric function as represented by Formula (8) below.

[Formula 8]

$$\tau_L = A_L \cdot \cos(2\pi f_d t) + B_L \cdot \sin(2\pi f_d t) \quad (8)$$

In Formula (8), $f_d$ represents the disturbance frequency, and t represents time. In addition, $A_L$ represents the amplitude of the cosine component of the load torque pulsation, and $B_L$ represents the amplitude of the sine component of the load torque pulsation.

Similarly, the motor torque $\tau_m$ can also be expressed by a trigonometric function as represented by Formula (9) below.

[Formula 9]

$$\tau_m = A_m \cdot \cos(2\pi f_d t) + B_m \cdot \sin(2\pi f_d t) \tag{9}$$

In Formula (9), $A_m$ represents the amplitude of the cosine component of the motor torque pulsation, and $B_m$ represents the amplitude of the sine component of the motor torque pulsation.

With the load torque $\tau_L$ and the motor torque $\tau_m$ defined as described above, a graph of two axes can be drawn by the cosine components and the sine components thereof, as illustrated in FIG. 4.

Vibration suppression control is executed to match the load torque $T_L$ and the motor torque $\tau_m$ as much as possible. Here, consider a case where the absolute value of the amplitude of the load torque $\tau_L$ is equal to the absolute value of the amplitude of the motor torque $\tau_m$, that is, a case where the relationship of Formula (10) below holds.

[Formula 10]

$$\sqrt{A_m^2 + B_m^2} = \sqrt{A_L^2 + B_L^2} \tag{10}$$

When the relationship of Formula (10) holds and the phase difference between the motor torque $\tau_m$ and the load torque $\tau_L$ is 60 degrees, the relationship among the load torque $\tau_L$, the motor torque $\tau_m$, and the difference between the two torques, or a torque difference $\tau_m - \tau_L$, is an equilateral triangle as illustrated in FIG. 4. That is, the absolute value of the torque difference $\tau_m - \tau_L$ is equal to the absolute value of the amplitude of the load torque $\tau_L$. Therefore, when the phase difference between the motor torque $\tau_m$ and the load torque $\tau_L$ exceeds 60 degrees, the absolute value of the torque difference $\tau_m - \tau_L$ is larger than the absolute value of the amplitude of the load torque $\tau_L$. This is obvious from FIG. 4, in which the vector diagram shows an equilateral triangle.

If the absolute value of the torque difference $\tau_m - \tau_L$ cannot be reduced even by causing the motor torque $\tau_m$ to pulsate through vibration suppression control, it is better not to perform the vibration suppression control in terms of power efficiency. Therefore, when the phase difference between the motor torque $\tau_m$ and the load torque $\tau_L$ exceeds ±60 degrees, it can be said that the vibration suppression control has failed.

As can be understood from the above description, the phase difference between the motor torque $\tau_m$ and the load torque $\tau_L$ is an extremely important factor in vibration suppression control.

The phase of the model deviation $\varepsilon$ greatly changes depending on the disturbance frequency $f_d$. Therefore, in the case where the model deviation $\varepsilon$ is used as the input of vibration suppression control instead of the true angular velocity $\omega_r$, the range of the disturbance frequency $f_d$ that ensures successful vibration suppression control is extremely narrow if the phase change is not considered.

Thus, the phase lead amount calculation unit 6 according to the first embodiment calculates the phase change of the transfer function $G_\varepsilon(s)$ such as that illustrated in the Bode plot of FIG. 3 using the disturbance frequency $f_d$ as input. When the phase of the transfer function $G_\varepsilon(s)$ is expressed as $\angle G_\varepsilon(j\omega_d)$, $\angle G_\varepsilon(j\omega_d)$ means a phase in the delay direction. Note that j represents the imaginary unit, and $\omega_d$ represents the disturbance angular frequency. In addition, $\omega_d = 2\pi f_d$ is satisfied.

From the viewpoint of the model deviation $\varepsilon$, the true angular velocity $\omega_r$ appears to be leading in phase. Therefore, in this description, $\angle G_\varepsilon(j\omega_d)$ is referred to as the "phase delay amount", and $-\angle G_\varepsilon(j\omega_d)$ obtained by inverting the sign of $\angle G_\varepsilon(j\omega_d)$ is referred to as the "phase lead amount".

If the phase lead amount $-\angle G_\varepsilon(j\omega_d)$ is known, vibration suppression control can be performed in a wide range of disturbance frequencies by advancing the phase of the model deviation $\varepsilon$ by that amount. Note that the vibration suppression control unit 5 may have any configuration. Here, an improved version of the technique described in Patent Literature 2 will be described as an example.

Returning to FIG. 1, the vibration suppression control unit 5 includes a speed pulsation calculator 51, integral (I) controllers 52 and 53, and an AC restorer 54.

The speed pulsation calculator 51 extracts a specific frequency component included in the model deviation $\varepsilon$ into DC based on the principle of Fourier series expansion. The specific frequency means the disturbance frequency $f_d$ described above, but has a more extended definition in this description. Generally, load torque pulsation has several frequency components. Any of these frequencies is referred to as a specific frequency component in this description. A cosine coefficient $E_c$ and a sine coefficient $E_s$ are output from the speed pulsation calculator 51, and these coefficients represent the specific frequency component in the form of DC.

Here, the cosine coefficient $E_c$ of the model deviation $\varepsilon$ and the sine coefficient $E_s$ of the model deviation $\varepsilon$ are calculated with Formulas (11) and (12) below based on the model deviation $\varepsilon$, the disturbance frequency $f_d$, and the phase lead amount $-\angle G_\varepsilon(j\omega_d)$.

[Formula 11]

$$E_c = \frac{2}{T_d} \int_0^{T_d} \varepsilon \cdot \cos(2\pi f_d t - (-\angle G_\varepsilon(j\omega_d)))dt \tag{11}$$

[Formula 12]

$$E_s = \frac{2}{T_d} \int_0^{T_d} \varepsilon \cdot \sin(2\pi f_d t - (-\angle G_\varepsilon(j\omega_d)))dt \tag{12}$$

In Formulas (11) and (12), t represents time. In addition, $T_d$ represents the cycle of disturbance, and the cycle $T_d$ of disturbance is the reciprocal of the disturbance frequency $f_d$. That is, $T_d = 1/f_d$ is satisfied.

In Formulas (11) and (12), the phase change in the transfer function $G_\varepsilon(s)$ is considered by changing the phase of the detection signal of the Fourier series expansion, instead of advancing the phase of the model deviation $\varepsilon$. Of course, instead of changing the phase of the detection signal, a calculation in which the phase of the model deviation $\varepsilon$ is directly operated may be performed at a stage prior to the Fourier series expansion. However, the method of changing the phase of the detection signal is better than the method of directly operating the phase of the model deviation $\varepsilon$ in terms of simplicity of calculation.

The I controller 52 integrates the cosine coefficient $E_c$ of the model deviation $\varepsilon$, and calculates a pulsation component $\tau_c$ of the motor torque as in Formula (13) below. The I controller 53 integrates the sine coefficient $E_s$ of the model deviation F, and calculates a pulsation component $\tau_s$ of the motor torque as in Formula (14) below.

[Formula 13]
$$\tau_c = \frac{K_I}{s} E_c \qquad (13)$$

[Formula 14]
$$\tau_s = \frac{K_I}{s} E_s \qquad (14)$$

Here, $K_I$ represents the integral gain. The integral gain $K_1$ is a numerical value determined by considering the gain value in the Bode plot of FIG. 3, equations of motion in the mechanical system, and the like. Note that a PI controller or a PID controller may be used instead of the I controllers 52 and 53 even though complicated control gain design is required in such a case.

Since the cosine coefficient $E_c$ and the sine coefficient $E_s$ are DC amounts, the pulsation components $\tau_c$ and $\tau_s$ of the motor torque $\tau_m$ are also DC amounts. In order to suppress vibration, it is necessary to cause the motor torque $\tau_m$ to pulsate. Therefore, it is necessary to restore the pulsation components $\tau_c$ and $\tau_s$ of the motor torque $\tau_m$ to AC.

The AC restorer 54 calculates the second torque command $\tau^*_2$ as in Formula (15) below based on the pulsation components $\tau_c$ and $\tau_s$ of the motor torque $\tau_m$ and the disturbance frequency $f_d$.

[Formula 15]
$$\tau^*_2 = \tau_s \cdot \cos(2\pi f_d t) - \tau_c \cdot \sin(2\pi f_d t) \qquad (15)$$

Torque pulsation and speed pulsation are different in phase by 90 degrees. Therefore, in Formula (15), the sine wave and the cosine wave are shifted by 90 degrees, and the pulsation components $\tau_c$ and $\tau_s$ are multiplied by the shifted sine and cosine waves, respectively.

In the AC restoration with Formula (15), the phase lead amount $-\angle G_\varepsilon(j\omega_d)$ is not used. For this reason, a corresponding phase difference is generated between the detection signal and the trigonometric function of the restoration signal. With this phase difference component, the phase change of the transfer function $G_\varepsilon(s)$ is taken into consideration, which makes it possible to determine the second torque command $\tau^*_2$ that can appropriately suppress vibration even when the disturbance frequency $f_d$ changes. In addition, by causing the motor torque $\tau_m$ to pulsate based on the second torque command $\tau^*_2$, it is possible to perform vibration suppression control in a wide range of frequencies even under position sensorless control.

FIG. 5 depicts operation waveform examples in the drive device 101 according to the first embodiment. FIG. 6 depicts operation waveform examples different from those in FIG. 5 in the drive device 101 according to the first embodiment. In FIGS. 5 and 6, the horizontal axis represents time, the vertical axis of the waveforms in the upper section represents the magnitude of the angular velocity $\omega_r$, and the vertical axis of the waveforms in the lower section represents the magnitude of torque. In the lower section of each of FIGS. 5 and 6, solid lines represent the load torque $\tau_L$, and broken lines represent the motor torque $\tau_m$. The horizontal axes of the upper and lower sections in FIGS. 5 and 6 are all drawn on the same scale.

FIG. 5 is operation waveform examples associated with high-speed rotation. The examples of FIG. 5 represent cases in which the disturbance frequency $f_d$ of load torque pulsations increases in proportion to the angular velocity $\omega_r$.

FIG. 5(a) is an example of the result of an operation in which vibration suppression control is not performed. In this example, an attempt is made to drive the AC motor 2 at a constant angular velocity, but the load torque $\tau_L$ has non-sinusoidal periodic pulsations. The above-described speed control unit 3 has the role of causing the angular velocity $\omega_r$ to follow the angular velocity command $\omega^*_r$, but the frequency of the load torque $\tau_L$ is much higher than the speed control response. Therefore, only slight pulsations are observed in the motor torque $\tau_m$, and the amplitude difference between the load torque $\tau_L$ and the motor torque $\tau_m$ is significantly large. Therefore, in FIG. 5(a), large pulsations occur in the angular velocity $\omega_r$ due to the influence of the load torque pulsations.

FIG. 5(b) is a comparative example which indicates the result of an operation in which vibration suppression control is performed without performing phase lead amount calculation. FIG. 5(c) is the result of an operation in which the vibration suppression control combined with phase lead amount calculation according to the first embodiment is performed. Both FIGS. 5(b) and 5(c) show successful vibration suppression control, in which the pulsations in the angular velocity $\omega_r$ are smaller than those in FIG. 5(a). The motor torque $\tau_m$ at this time substantially matches the fundamental wave component of the load torque pulsations.

In the examples of FIG. 5, the main frequency component of the load torque waveform is targeted in vibration suppression control. In addition, the input of vibration suppression control is not the true angular velocity $\omega_r$ or the estimated angular velocity $\omega^\wedge_r$ but the model deviation $\varepsilon$.

The reason of the success of the vibration suppression control in both FIGS. 5(b) and 5(c) is that the phase lead amount is extremely small under this disturbance frequency condition. When the phase lead amount is extremely small, vibration suppression is successfully performed without the need of calculating the phase lead amount, but this is limited to a narrow frequency range.

On the other hand, FIG. 6 is operation waveform examples associated with low-speed rotation. For convenience of explanation, the scale of the vertical axis of the waveforms in the upper section of FIG. 6 is slightly different from that in FIG. 5. The scale of the vertical axis of the waveforms in the lower section is the same as that in FIG. 5.

FIG. 6(a) is an example of the result of an operation in which vibration suppression control is not performed. In this example, an attempt is made to drive the AC motor 2 at a constant angular velocity, but large pulsations are observed in the angular velocity $\omega_r$ due to the influence of the load torque pulsations. This phenomenon is similar to that in the case of FIG. 5(a). Note that FIG. 6(a) is different from FIG. 5(a) in that the motor torque $\tau_m$ also pulsates, which is because the frequency of load torque pulsations is low. In FIG. 6(a), the load torque $\tau_L$ and the motor torque $\tau_m$ are out of phase with each other, and the vibration suppression is not so accurate.

FIG. 6(b) is a comparative example which indicates the result of an operation in which vibration suppression control is performed without performing phase lead amount calculation. FIG. 6(c) is the result of an operation in which the vibration suppression control combined with phase lead amount calculation according to the first embodiment is performed. Unlike FIG. 5(b), FIG. 6(b) shows failed vibration suppression control. It is notable that the pulsations in the angular velocity $\omega_r$ are larger than those in FIG. 6(a). In FIG. 6(b), the motor torque $\tau_m$ and the load torque $\tau_L$ greatly differ in both amplitude and phase, and the vibration suppression is out of control. On the other hand, FIG. 6(c) shows successful vibration suppression control achieved through the implementation of phase lead amount calculation, in which the pulsations in the angular velocity $\omega_r$ are smaller than those in FIG. 6(a).

As described above, it is apparent from the operation results of FIGS. 5 and 6 that when vibration suppression control is performed using the model deviation $\varepsilon$ of the adaptive observation unit 1, it is possible to achieve vibration suppression in a wide range of frequencies by considering the phase lead amount.

Next, differences between the method according to the first embodiment and the prior art documents will be described. First, the similarity between the method according to the first embodiment and the method described in Patent Literature 2 is that components corresponding to the speed pulsation calculator 51, the I controllers 52 and 53, and the AC restorer 54 described above are provided. On the other hand, the method according to the first embodiment greatly differs from the method described in Patent Literature 2 in the following two points.

In the calculation processing with Formulas (11) and (12), Instead of the true angular velocity $\omega_r$, the model deviation $\varepsilon$ is used.

The phase of the sine wave and the cosine wave, i.e. detection signal of the Fourier series expansion, is changed by the phase lead amount $-\angle G_\varepsilon(j\omega_d)$.

In position sensorless control, the true angular velocity $\omega_r$ is impossible to observe. In addition, if the estimated angular velocity $\hat{\omega}_r$ is used instead of the true angular velocity $\omega_r$, it is impossible to suppress high-frequency vibration due to the upper limit of the speed estimation response. Nonetheless, when the model deviation $\varepsilon$ is used as the input of vibration suppression control instead of the true angular velocity $\omega_r$, it is not possible to respond to changes in the disturbance frequency $f_d$ without the correction of the phase lead amount $-\angle G_\varepsilon(j\omega_d)$ described above.

Next, differences between the method according to the first embodiment and the method described in Patent Literature 1 will be described. A clear difference between the first embodiment and Patent Literature 1 is the angular velocity estimation unit 12. The angular velocity estimation unit 12 in the method described in Patent Literature 1 is configured in a way significantly different from the existing method. In the event that the angular velocity estimation unit 12 is significantly changed in an existing drive device for an AC motor, it is necessary to investigate closely whether any trouble is likely to occur in the drive device due to the change. In the case of adding the method of Patent Literature 1 as an extended function to the existing functionality, the better the market performance of the drive device, the more man-hours that are required to conduct reliability evaluation associated with the functional addition. Therefore, the technique of Patent Literature 1 is difficult to implement in many cases. In contrast, the first embodiment has proposed the method of performing vibration suppression control based on the model deviation $\varepsilon$ generated through the internal processing of the adaptive observation unit 1, without changing the angular velocity estimation unit 12. This method makes it easy to add high-performance position-sensorless vibration suppression control as an extended function to a drive device with good market performance.

As a secondary effect, the method according to the first embodiment has a reduced calculation amount of vibration suppression control as compared with the method described in Patent Literature 1. The controller described in Patent Literature 1 is configured to perform vibration suppression control after performing precise acceleration estimation. Therefore, Patent Literature 1 requires four PI controllers. In contrast, the first embodiment requires only two I controllers, and thus has a simplified configuration. The technique of the first embodiment has an increased number of calculations for phase lead amount compensation but a reduced number of trigonometric function calculations, and is therefore considered to be easier to implement.

Figure 7:
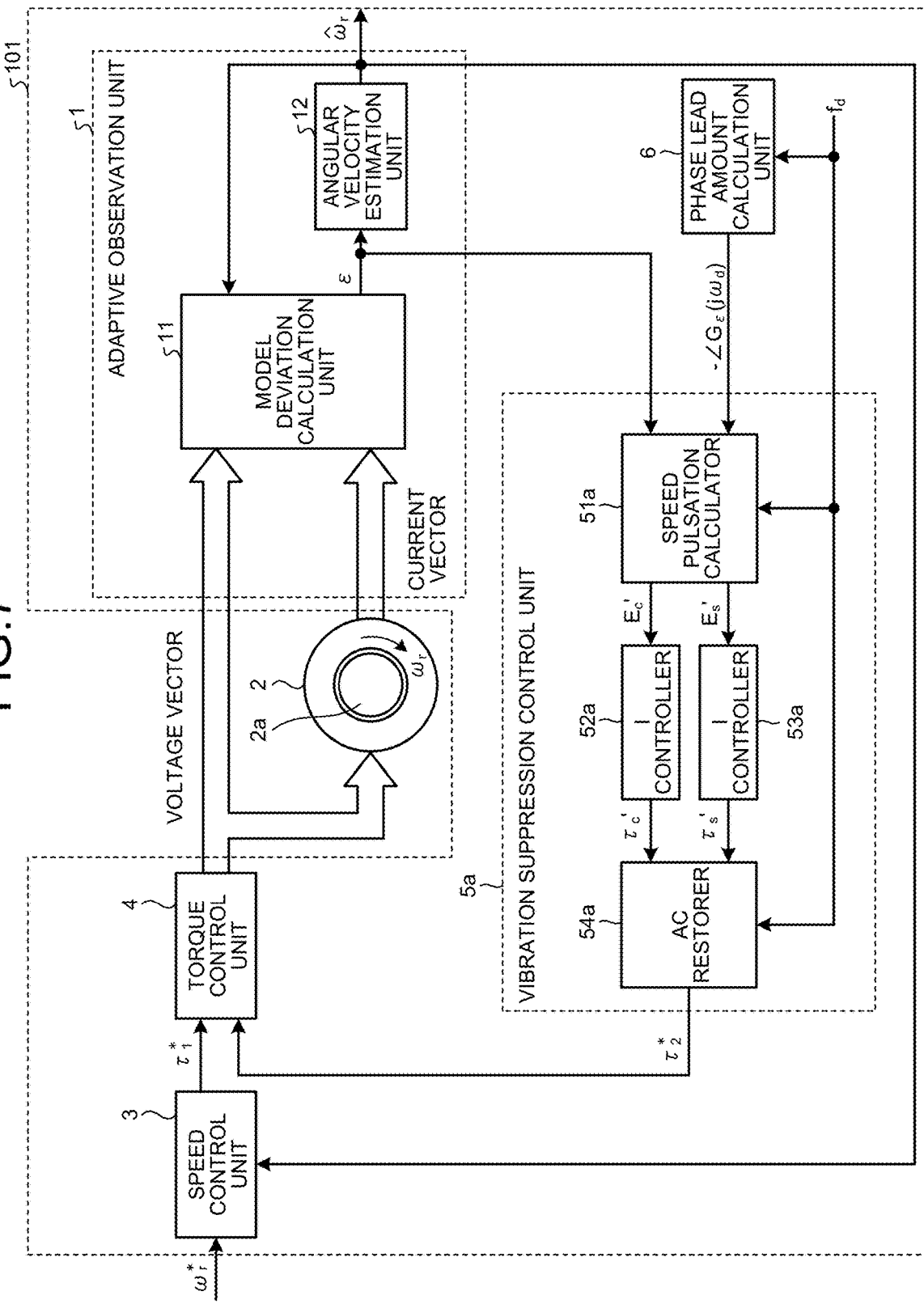
FIG. 7 is a block diagram illustrating a first modification of the configuration of the first embodiment illustrated in FIG. 1.

As will be apparent to those skilled in the art, the mathematical formulas or block diagrams described herein can be modified as appropriate. A possible example is the configuration illustrated in FIG. 7. FIG. 7 is a block diagram illustrating a first modification of the configuration of the first embodiment illustrated in FIG. 1. FIG. 7 includes a vibration suppression control unit 5a in place of the vibration suppression control unit 5 in the configuration illustrated in FIG. 1. The vibration suppression control unit 5a includes a speed pulsation calculator 51a in place of the speed pulsation calculator 51, I controllers 52a and 53a in place of the I controllers 52 and 53, respectively, and an AC restorer 54a in place of the AC restorer 54.

The speed pulsation calculator 51 illustrated in FIG. 1 calculates the cosine coefficient $E_c$ and the sine coefficient $E_s$ of the model deviation $\varepsilon$ using Formulas (11) and (12). On the other hand, the speed pulsation calculator 51a illustrated in FIG. 7 calculates a cosine coefficient $E_c'$ and a sine coefficient $E_s'$ of the model deviation $\varepsilon$ using Formulas (16) and (17) below.

[Formula 16]
$$E_c' = \frac{2}{T_d} \int_0^{T_d} \varepsilon \cdot \cos(2\pi f_d t) dt \quad (16)$$

[Formula 17]
$$E_s' = \frac{2}{T_d} \int_0^{T_d} \varepsilon \cdot \sin(2\pi f_d t) dt \quad (17)$$

The I controllers 52 and 53 illustrated in FIG. 1 calculate the pulsation components $\tau_c$ and $\tau_s$ of the motor torque $\tau_m$ using Formulas (13) and (14), respectively. On the other hand, the I controllers 52a and 53a illustrated in FIG. 7 calculate pulsation components $\tau_c'$ and $\tau_s'$ of the motor torque $\tau_m$ using Formulas (18) and (19) below, respectively.

[Formula 18]
$$\tau_c' = \frac{K_I}{s} E_c' \quad (18)$$

[Formula 19]
$$\tau_s' = \frac{K_I}{s} E_s' \quad (19)$$

The AC restorer 54 illustrated in FIG. 1 calculates the second torque command $\tau^*_2$ using Formula (15). On the other hand, the AC restorer 54a illustrated in FIG. 7 calculates the second torque command $\tau^*_2$ using Formula (20) below.

[Formula 20]

$$\tau^*_2 = \tau_s' \cdot \cos(2\pi f_d t - \angle G_\varepsilon(j\omega_d)) - \tau_c' \cdot \sin(2\pi f_d t - \angle G_\varepsilon(j\omega_d)) \quad (20)$$

As described above, whereas the vibration suppression control unit 5 illustrated in FIG. 1 performs the calculations with the phase lead amount by means of the speed pulsation calculator 51, the vibration suppression control unit 5a according to the first modification illustrated in FIG. 7 performs the calculations with the phase lead amount by means of the AC restorer 54a.

Figure 8:
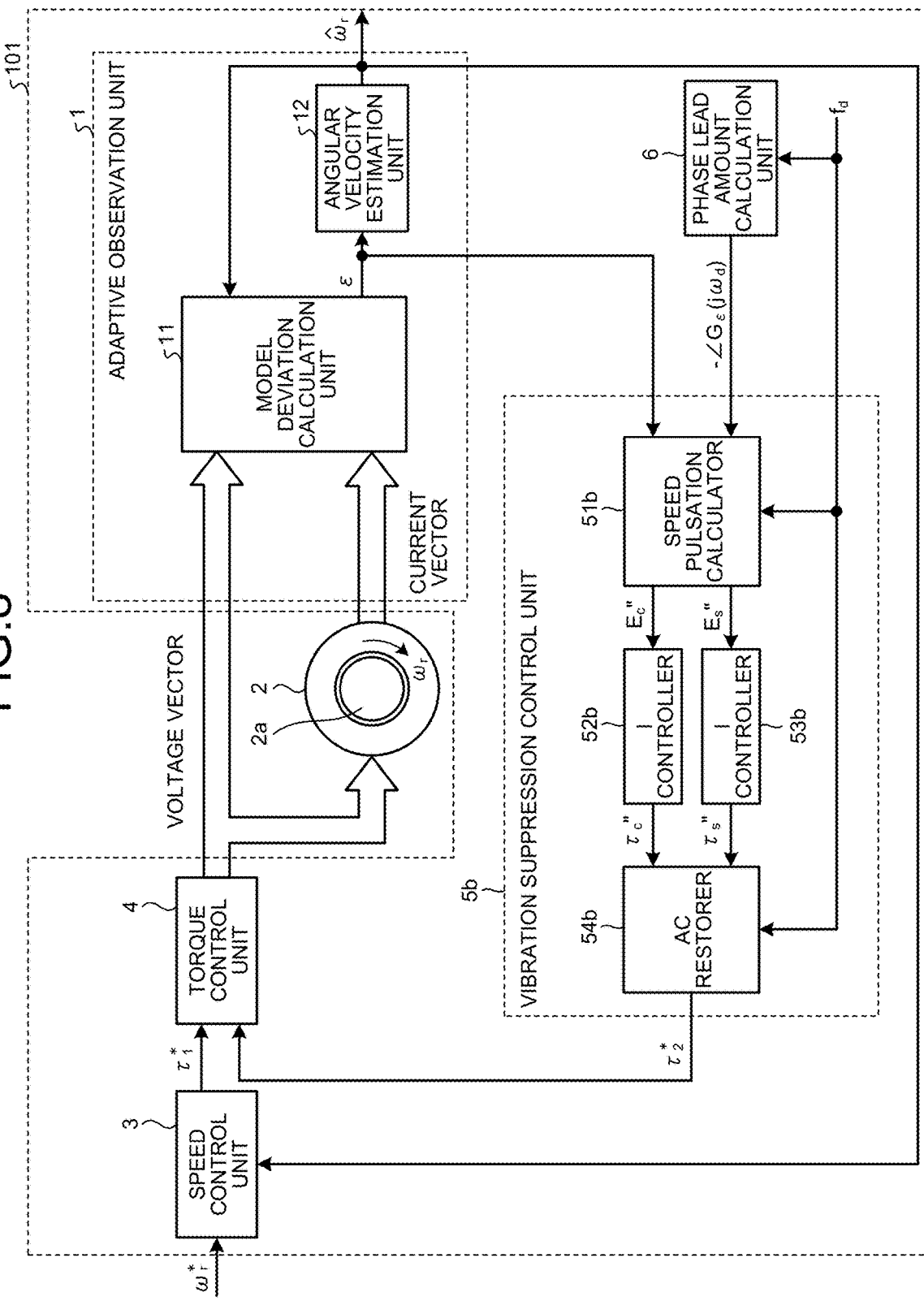
FIG. 8 is a block diagram illustrating a second modification of the configuration of the first embodiment illustrated in FIG. 1.

FIG. 8 is a block diagram illustrating a second modification of the configuration of the first embodiment illustrated in FIG. 1. FIG. 8 includes a vibration suppression control unit 5b in place of the vibration suppression control unit 5 in the configuration illustrated in FIG. 1. The vibration suppression control unit 5b includes a speed pulsation calculator 51b in place of the speed pulsation calculator 51, I controllers 52b and 53b in place of the I controllers 52 and 53, respectively, and an AC restorer 54b in place of the AC restorer 54.

The speed pulsation calculator 51 illustrated in FIG. 1 calculates the cosine coefficient $E_c$ and the sine coefficient $E_s$ of the model deviation $\varepsilon$ using Formulas (11) and (12). On the other hand, the speed pulsation calculator 51b illustrated in FIG. 8 calculates a cosine coefficient $E_c''$ and a sine coefficient $E_s''$ of the model deviation $\varepsilon$ using Formulas (21) and (22) below.

[Formula 21]

$$E_c'' = \frac{2}{T_d}\int_0^{T_d} \varepsilon \cdot \cos(2\pi f_d t - (-K \cdot \angle G_\varepsilon(j\omega_d)))dt \quad (21)$$

[Formula 22]

$$E_s'' = \frac{2}{T_d}\int_0^{T_d} \varepsilon \cdot \sin(2\pi f_d t - (-K \cdot \angle G_\varepsilon(j\omega_d)))dt \quad (22)$$

Note that K in Formulas (21) and (22) is an arbitrary real number of zero to one inclusive.

The I controllers 52 and 53 illustrated in FIG. 1 calculate the pulsation components $\tau_c$ and $\tau_s$ of the motor torque $\tau_m$ using Formulas (13) and (14), respectively. On the other hand, the I controllers 52b and 53b illustrated in FIG. 8 calculate pulsation components $\tau_c''$ and $\tau_s''$ of the motor torque $\tau_m$ using Formulas (23) and (24) below, respectively.

[Formula 23]

$$\tau_c'' = \frac{K_I}{s}E_c'' \quad (23)$$

[Formula 24]

$$\tau_s'' = \frac{K_I}{s}E_s'' \quad (24)$$

The AC restorer 54 illustrated in FIG. 1 calculates the second torque command $\tau^*_2$ using Formula (15). On the other hand, the AC restorer 54b illustrated in FIG. 8 calculates the second torque command $\tau^*_2$ using Formula (25) below.

[Formula 25]

$$\tau^*_2 = \tau_s'' \cdot \cos(2\pi f_d t - (1-K)\cdot\angle G_\varepsilon(j\omega_d)) - \tau_c'' \cdot \sin(2\pi f_d t - (1-K)\cdot\angle G_\varepsilon(j\omega_d)) \quad (25)$$

As described above, the vibration suppression control unit 5 illustrated in FIG. 1 performs the calculations with the phase lead amount by means of only the speed pulsation calculator 51, and the vibration suppression control unit 5a according to the first modification illustrated in FIG. 7 performs the calculations with the phase lead amount by means of only the AC restorer 54a. In contrast, the vibration suppression control unit 5b according to the second modification illustrated in FIG. 8 allocates the calculations with the phase lead amount to the speed pulsation calculator 51b and the AC restorer 54b.

Note that the block diagrams and the mathematical formulas described in the first and second modifications are equivalent modifications of FIG. 1 and Formulas (11) to (15), the detailed description of which is omitted here. Therefore, regardless of whether the calculations of Formulas (16) to (20) are performed or the calculations of Formulas (21) to (25) are performed, the performance of the vibration suppression control is the same as that in the case of performing the calculations of Formulas (11) to (15).

Figure 9:
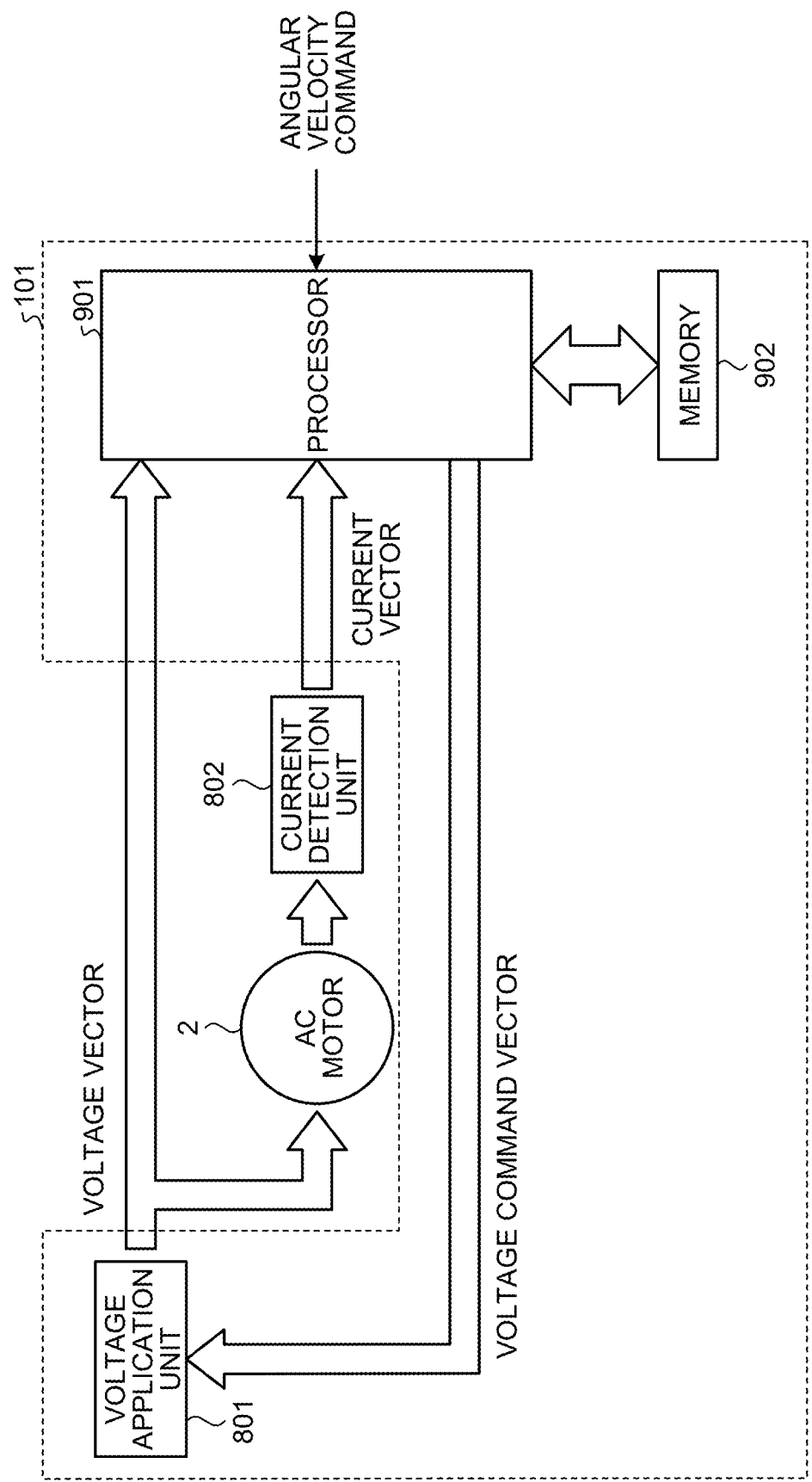
FIG. 9 is a diagram illustrating a hardware configuration of the drive device for an AC motor according to the first embodiment.

FIG. 9 is a diagram illustrating a hardware configuration of the drive device 101 according to the first embodiment. FIG. 9 depicts a voltage application unit 801 and a current detection unit 802, which are not illustrated in FIGS. 1, 7, and 8. The voltage application unit 801 is a voltage application means that applies a voltage to the AC motor 2. An example of the voltage application means is a power converter such as a three-phase PWM inverter. The voltage application unit 801 operates in accordance with the voltage command vector, and applies a voltage to the AC motor 2. In this description, the vector representation of the applied voltage applied by the voltage application unit 801 is referred to as the voltage vector. When the voltage application unit 801 is a power converter, the power converter involves switching. Therefore, the voltage command vector and the voltage vector always have instantaneous differences, but are substantially equivalent in terms of average values.

The drive device 101 includes a processor 901. The voltage vector is input to the drive device 101. The voltage vector is used for speed estimation calculation; however, the voltage command vector calculated inside the processor 901 may be used for speed estimation calculation instead of the voltage vector. The current vector is generated by the current detection unit 802 and input to the drive device 101. The current vector is vector information on the AC flowing through the AC motor 2. An example of the current vector is a detected value of the dq-axis current obtained by converting the AC detected by the current detection unit 802 into a dq-coordinate value.

The drive device 101 includes a memory 902. The memory 902 includes a volatile storage device (not illustrated) represented by a random access memory and a nonvolatile auxiliary storage device (not illustrated) represented by a flash memory. Note that the memory 902 may include an auxiliary storage device that is a hard disk, instead of the volatile storage device and the nonvolatile auxiliary storage device. The processor 901 executes a program input from the memory 902. Because the memory 902 includes the auxiliary storage device and the volatile storage device, the program is input from the auxiliary storage device to the processor 901 via the volatile storage device. In addition, the processor 901 may output the data of calculation results to the volatile storage device of the memory 902, or may store the data in the auxiliary storage device via the volatile storage device.

Various schemes have been studied for the voltage application unit 801 and the current detection unit 802, any of which may be used basically. The voltage application unit 801 and the current detection unit 802 may be provided inside the drive device 101. In addition, the drive device 101 may include a voltage detection means that detects the voltage vector output from the voltage application unit 801. In this case, the voltage application unit 801 may transmit a voltage vector command value to the processor 901, and a numerical value related to the voltage detected by the voltage detection means may be transmitted to the processor 901. Similarly, the current detection unit 802 may be configured to transmit a detected numerical value to the processor 901.

The processor 901 calculates the model deviation ε by means of the above-described model deviation calculation unit 11 based on the current vector and the voltage vector of the AC motor 2. The processor 901 determines the voltage command vector by performing the calculation of the phase lead amount calculation unit 6 and the calculation of the vibration suppression control unit 5 described above based on the model deviation ε. By performing control calculation in this manner, speed pulsations due to periodic disturbances can be accurately suppressed in a wide range of frequencies.

As described above, in the drive device for an AC motor according to the first embodiment, the adaptive observation unit adaptively estimates an angular velocity of a rotor of an AC motor that drives a mechanical device having periodic load torque pulsations. The speed control unit determines a first torque command with which an angular velocity command matches an average value of an estimated angular velocity. The phase lead amount calculation unit calculates, based on a disturbance frequency, a phase lead amount of a transfer function from a true angular velocity to a model deviation that is an internal quantity of the adaptive observation unit. The vibration suppression control unit determines, based on a frequency of the load torque pulsations, the model deviation, and the phase lead amount, a second torque command with which speed pulsations in the AC motor are suppressed. The torque control unit controls a torque of the AC motor based on the first torque command and the second torque command. Consequently, it is possible to perform vibration suppression control in a general-purpose drive device without modifying the adaptive observer that is the core part of the control. Therefore, it is possible to achieve the effect that an extended function to be added to the existing functionality can be easily implemented. In addition, it is possible to accurately suppress speed pulsations in the AC motor regardless of frequency.

In addition, the drive device for an AC motor according to the first embodiment can use the conventional speed estimation method as it is. Therefore, it is possible to prevent the problem in the method of Patent Literature 1, that is, a drastic increase in man-hours for impact investigation associated with a change in speed estimation method.

The vibration suppression control unit according to the first embodiment can be divided into three sections: a speed pulsation calculator, integral controllers, and an AC restoration unit. The speed pulsation calculator separately extracts a cosine component and a sine component of a specific frequency component included in the model deviation. The two integral controllers perform integral control such that each of the cosine component and the sine component becomes zero. The AC restoration unit restores an output of the integral controllers to an AC signal. For performing these processes, at least one of the speed pulsation calculator and the AC restoration unit is configured to perform calculation in which the phase lead amount is considered.

Second Embodiment

Figure 10:
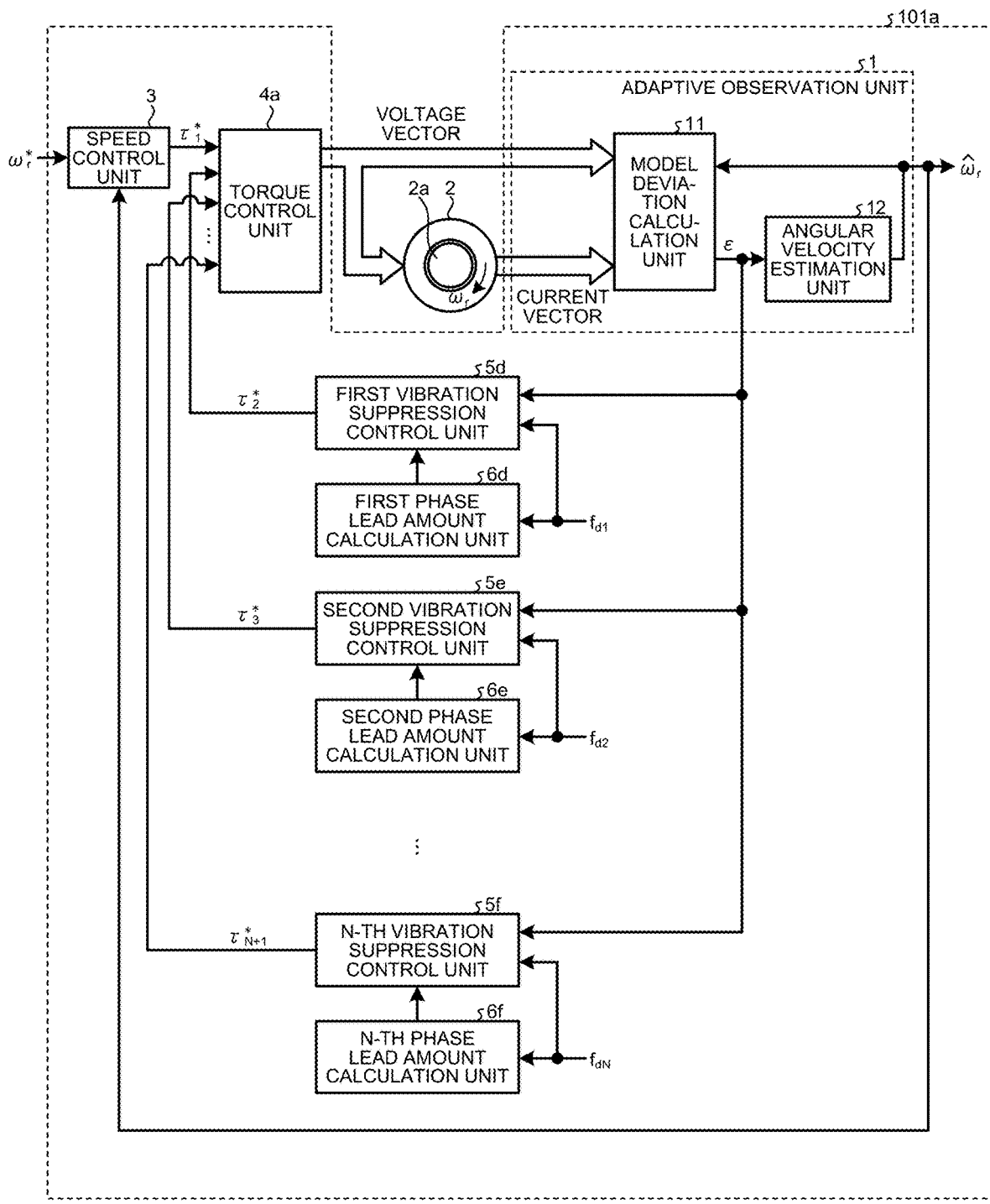
FIG. 10 is a block diagram illustrating a configuration of a drive device for an AC motor according to a second embodiment.

FIG. 10 is a block diagram illustrating a configuration of a drive device 101*a* for an AC motor according to the second embodiment. The drive device 101*a* in FIG. 10 according to the second embodiment includes a torque control unit 4*a* in place of the torque control unit 4 in the configuration of the drive device 101 in FIG. 1 according to the first embodiment. In addition, the vibration suppression control unit 5 is replaced with a first vibration suppression control unit 5*d*, and the phase lead amount calculation unit 6 is replaced with a first phase lead amount calculation unit 6*d*. Furthermore, the drive device 101*a* according to the second embodiment includes second to N-th vibration suppression control units 5*e* to 5*f*, and includes second to N-th phase lead amount calculation units 6*e* to 6*f*. Here, N is an integer of two or more. That is, while the first embodiment shows the configuration in which one vibration suppression control unit and one phase lead amount calculation unit are provided, the second embodiment shows the configuration in which a plurality of vibration suppression control units and a plurality of phase lead amount calculation units are provided. Note that the other parts of the configuration are the same as or equivalent to those in FIG. 1. The same or equivalent components are denoted by the same reference signs, and redundant descriptions are omitted.

In general, the characteristics of the angular velocity pulsations included in the angular velocity of an AC motor vary depending on the application to be applied or depending on the load device to be connected. Now consider a case where the load device to be connected has periodic torque fluctuations using a rotary compressor as an example.

Figure 11:
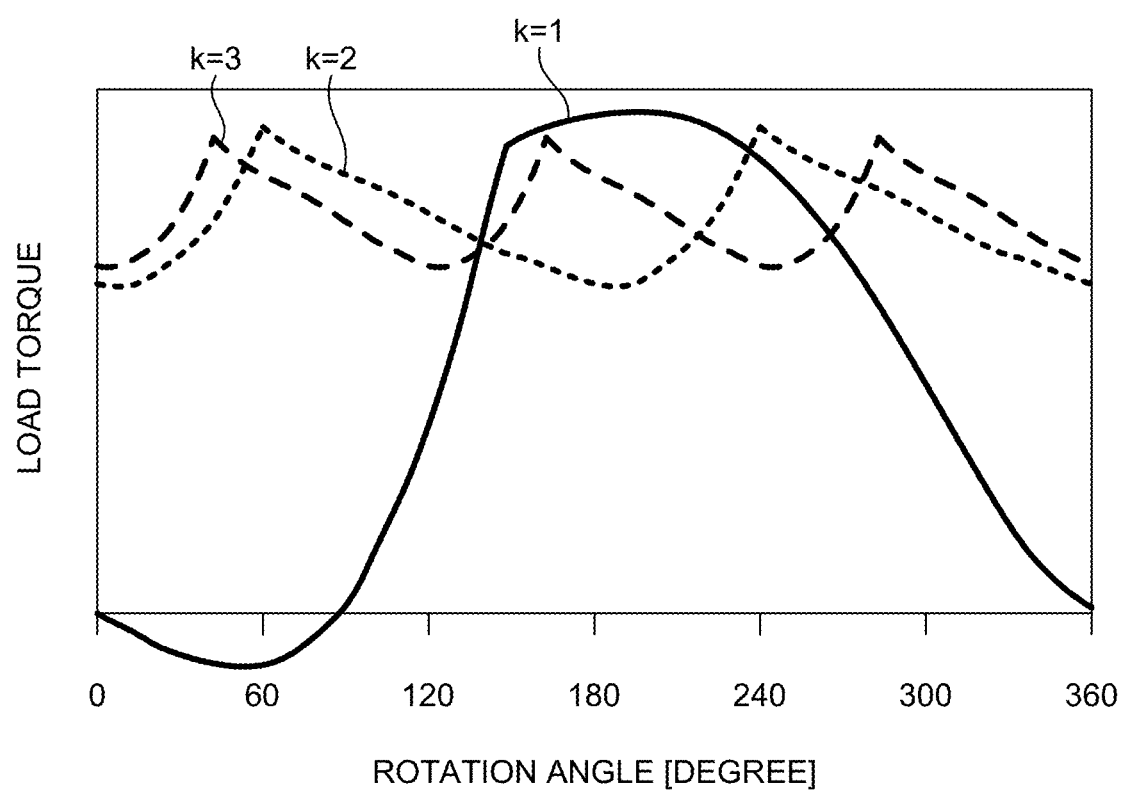
FIG. 11 is a diagram illustrating exemplary waveforms of the load torque of a rotary compressor which is an example of a load device according to a second embodiment.

FIG. 11 is a diagram illustrating exemplary waveforms of the load torque of a rotary compressor which is an example of a load device according to the second embodiment. The horizontal axis represents the rotation angle, and the vertical axis represents the load torque. Here, the number of compression chambers of the rotary compressor is assumed to be k. The rotation angle of 0 to 360 degrees is one cycle of the mechanical angle, that is, a mechanical angular cycle.

First, in the case where there is only one compression chamber, that is, in the case of k=1, the load torque greatly vibrates over a mechanical angular cycle as indicated by the solid line in FIG. 11. The second and third harmonics are also included in the load torque waveform, but the first-order vibration is the largest. Therefore, when the configuration of the first embodiment is applied, setting the disturbance frequency $f_d$ to the primary frequency of the mechanical angular frequency enables the largest first-order angular velocity pulsation to be suppressed.

In the second embodiment, a plurality of vibration suppression control units are provided in parallel. Therefore, it is possible to simultaneously suppress speed pulsations due to the second-order and third-order torque fluctuations included in the load torque characteristic. In the example of FIG. 10, a first disturbance frequency $f_{d1}$ that is input to the first vibration suppression control unit 5*d* and the first phase lead amount calculation unit 6*d* is set to the primary frequency of the mechanical angular frequency. Then, a second disturbance frequency $f_{d2}$ that is input to the second vibration suppression control unit 5*e* and the second phase lead amount calculation unit 6*e* is set to the second-order frequency of the mechanical angular frequency. Furthermore, an N-th disturbance frequency $f_{dN}$ that is input to the N-th vibration suppression control unit 5*f* and the N-th phase lead amount calculation unit 6*f* is set to the third-order frequency of the mechanical angular frequency. The calculations that are performed in the individual vibration suppression control units and the individual phase lead amount calculation units are the same as those described in the first embodiment. The torque control unit 4*a* drives the AC motor 2 based on the first torque command τ*₁ output from the speed control unit 3 and the second to (N+1)-th torque commands (τ*₂, τ*₃, . . . , and τ*ₙ₊₁) output from the first to N-th vibration suppression control units 5d to 5f, respectively. Specifically, control is performed such that the sum of the first to (N+1)-th torque commands (τ*₁, τ*₂, τ*₃, . . . , and τ*ₙ₊₁) matches the output torque of the AC motor 2. This makes it possible to suppress all of the first-, second-, and third-order speed pulsations.

The same applies to the case where the number of compression chambers is two or three, that is, the case of k=2 or k=3. As the number of compression chambers increases, the structure becomes more complicated and the cost increases, but the waveform has smaller pulsations as illustrated in FIG. 11. Specifically, the second harmonic component of the mechanical angular frequency is large in the case of k=2, and the third harmonic component is large in the case of k=3.

For example, in the case of k=2, as illustrated in FIG. 11, the second-order vibration of the mechanical angular cycle is dominant. Therefore, the disturbance frequency $f_{d1}$ that is input to the first vibration suppression control unit 5d and the first phase lead amount calculation unit 6d is set to the second-order frequency component of the mechanical angular frequency. In addition, if vibration of any other frequency component higher than the second order is to be suppressed, this frequency component can be input to each of the second vibration suppression control unit 5e and the second phase lead amount calculation unit 6e as the second disturbance frequency $f_{d2}$.

As another example, in the case of k=3, the third-order vibration of the mechanical angular cycle is dominant as illustrated in FIG. 11. Therefore, the disturbance frequency $f_{d1}$ that is input to the first vibration suppression control unit 5d and the first phase lead amount calculation unit 6d is set to the third-order frequency component of the mechanical angular frequency. In addition, if vibration of any other frequency component higher than the third order is to be suppressed, this frequency component can be input to each of the second vibration suppression control unit 5e and the second phase lead amount calculation unit 6e as the second disturbance frequency $f_{d2}$.

As described above, in the drive device for an AC motor according to the second embodiment, a plurality of the vibration suppression control units and a plurality of the phase lead amount calculation units are provided, and the phase lead amount calculation units provided correspond one-to-one to the vibration suppression control units. The plurality of vibration suppression control units calculate torque commands based on different specific high-frequency components, and the torque control unit is configured to operate based on the torque commands output from the plurality of vibration suppression control units. This makes it possible to simultaneously suppress vibrations of multiple orders. As a result, it is possible to further suppress the angular velocity pulsations included in the angular velocity of the AC motor.

Third Embodiment

Figure 12:
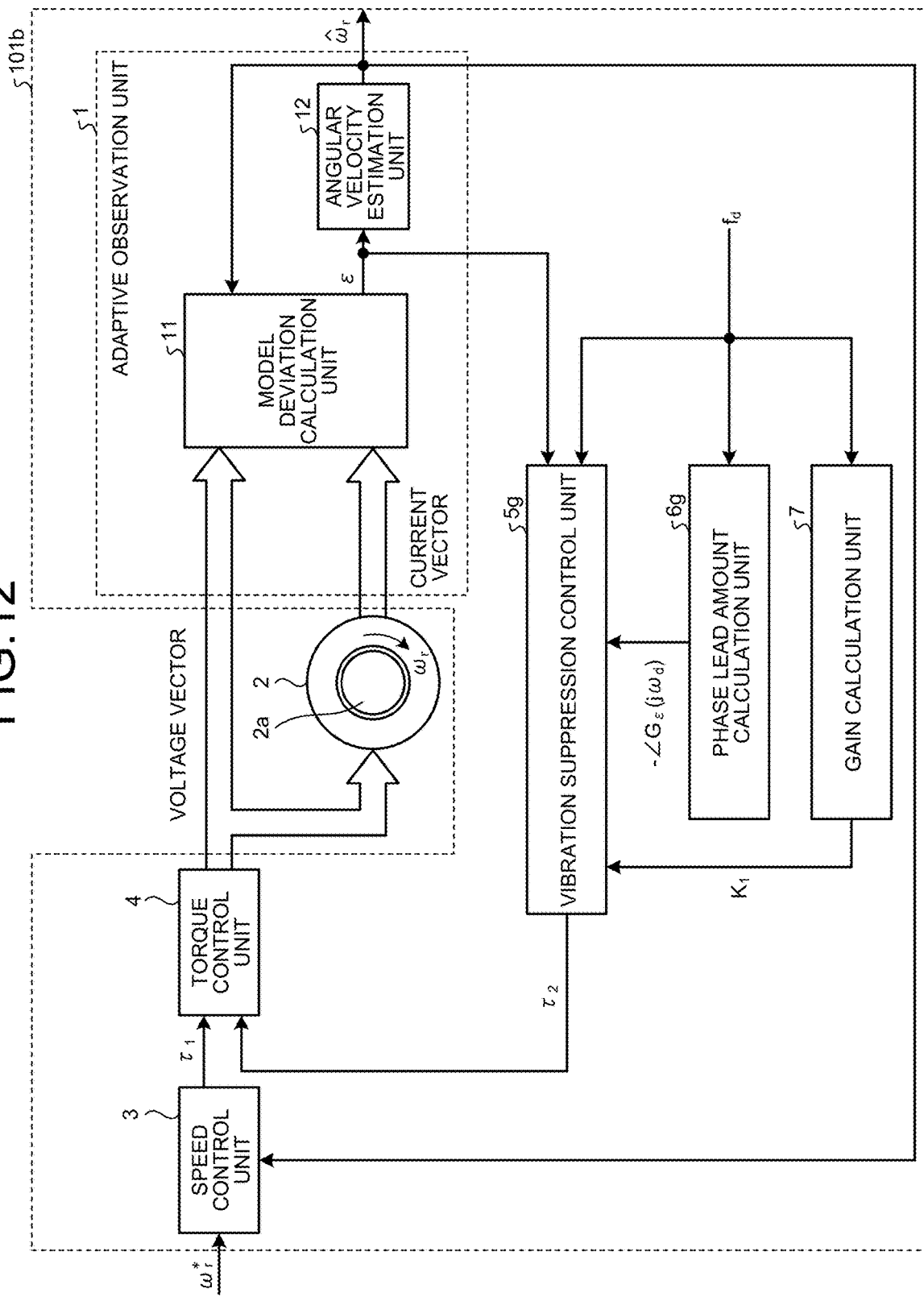
FIG. 12 is a diagram illustrating a configuration of a drive device for an AC motor according to a third embodiment.

FIG. 12 is a diagram illustrating a configuration of a drive device 101b for an AC motor according to the third embodiment. The drive device 101b in FIG. 12 according to the third embodiment includes a vibration suppression control unit 5g and a phase lead amount calculation unit 6g in place of the vibration suppression control unit 5 and the phase lead amount calculation unit 6, respectively, in the configuration of the drive device 101 in FIG. 1 according to the first embodiment. Furthermore, the drive device 101b according to the third embodiment includes a gain calculation unit 7. Note that the configuration in FIG. 12 is based on the drive device 101 according to the first embodiment, which is only an example. The drive device 101b may be configured using the drive device 101a described in the second embodiment. The configurations and functions of the drive devices 101 and 101a are as described above, and the descriptions thereof are omitted here.

In FIG. 12, the gain calculation unit 7 has a function of dynamically changing the integral gain $K_I$ of vibration suppression control indicated by Formulas (13) and (14) and the like according to the disturbance frequency $f_d$. The gain calculation unit 7 enables the time required for the vibration to converge after the start of vibration suppression control to be set to an arbitrary value.

The gain characteristic of the transfer function $G_ε(s)$ from the true angular velocity $ω_r$ to the model deviation ε greatly varies depending on the disturbance frequency $f_d$ as already indicated in FIG. 3. If the integral gain $K_I$ of vibration suppression control is determined without considering this, the time constant for the vibration to converge after the start of vibration suppression control greatly varies depending on the disturbance frequency $f_d$, which may complicate the control adjustment. On the other hand, the use of the gain calculation unit 7 can facilitate the control adjustment. Note that the reciprocal of this time constant is generally referred to as the "control response".

Next, a gain calculation method will be described using an interior permanent magnet synchronous motor as an example. In the interior permanent magnet synchronous motor, when the reluctance torque derived from the d-axis current is ignored, the transfer function from the q-axis current $i_q$ to the angular velocity $ω_r$, which is the electrical angular velocity, is expressed by Formula (26) below. When determining the integral gain $K_I$ of vibration suppression control, it is necessary to consider Formula (26) first.

[Formula 26]

$$\frac{ω_r}{i_q} = \frac{p_m^2 \phi_a}{Js} \qquad (26)$$

In Formula (26), $P_m$ represents the number of pole pairs, J represents the moment of inertia, and $\varphi_a$ represents the number of interlinkage magnetic fluxes in the dq axes.

Since Formula (26) has an integral characteristic of 1/s, the torque required to suppress speed pulsations increases as the disturbance frequency $f_d$ becomes higher, provided that the amplitude of the speed pulsations remains the same. Therefore, in order to make the control response of vibration suppression control constant, the integral gain $K_I$ of vibration suppression control must be proportional to the disturbance angular frequency $ω_d$ (=$2πf_d$).

Furthermore, the control response of vibration suppression control cannot be designated unless the gain characteristic of the transfer function $G_ε(s)$ from the true angular velocity $ω_r$ to the model deviation ε is simultaneously considered. The gain characteristic of the frequency transfer function $G_ε(jω_d)$ is attenuation in the low- and high-frequency ranges as shown in FIG. 3. Therefore, the integral gain $K_I$ of vibration suppression control is set to increase in the low- and high-frequency ranges. This is achieved simply by multiplying the integral gain $K_I$ by the reciprocal of the absolute value $|G_\varepsilon(j\omega_d)|$ of the frequency transfer function $G_\varepsilon(j\omega_d)$, for the absolute value $|G_\varepsilon(j\omega_d)|$ is known to the control designer.

Taking these into consideration, it is clear that the integral gain $K_I$ of vibration suppression control can be calculated with Formula (27) below so as to designate the control response of vibration suppression control to an arbitrary value.

[Formula 27]

$$K_I = \frac{J\omega_d}{p_m^2 \phi_a |G_\varepsilon(j\omega_d)|} \omega_I \quad (27)$$

The gain calculation unit 7 calculates the integral gain $K_I$ with Formula (27) and provides the integral gain $K_I$ to the vibration suppression control unit 5g. The vibration suppression control unit 5g performs vibration suppression control using the integral gain $K_I$ provided by the gain calculation unit 7 and the phase lead amount $-\angle G_\varepsilon(j\omega_d)$ provided by the phase lead amount calculation unit 6g.

As described above, the drive device for an AC motor according to the third embodiment includes a gain calculation unit that calculates a gain characteristic of the transfer function, and the integral controllers perform control calculation by considering the gain characteristic. This makes it possible to change the integral gain of vibration suppression control as a function of the disturbance angular frequency, and to set the time constant for the vibration to converge to a desired value. As a result, it is possible to facilitate the control adjustment work.

Fourth Embodiment

Figure 13:
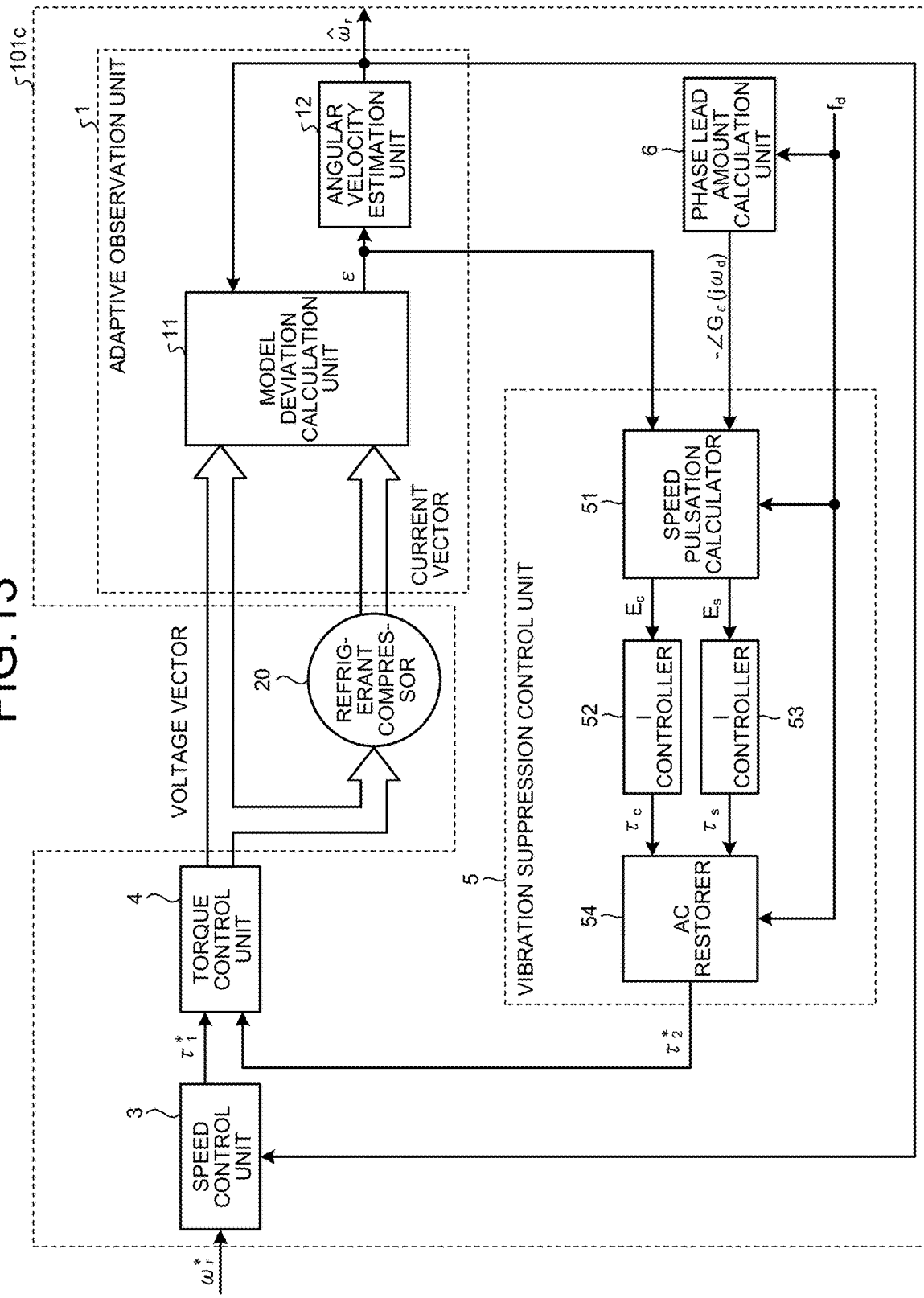
FIG. 13 is a block diagram illustrating a configuration of a drive device for an AC motor according to a fourth embodiment.

FIG. 13 is a block diagram illustrating a configuration of a drive device 101c for an AC motor according to the fourth embodiment. FIG. 13 includes a refrigerant compressor 20 including the AC motor 2 in place of the AC motor 2 illustrated in FIG. 1. The drive device 101c according to the fourth embodiment is configured as a compressor drive device using the drive device 101 according to the first embodiment so as to reduce speed pulsations in the refrigerant compressor 20. Note that the configuration in FIG. 13 is based on the drive device 101 according to the first embodiment, which is only an example. The drive device 101c may be configured using the drive device 101a described in the second embodiment or the drive device 101b described in the third embodiment. Note that the configurations and functions of the drive devices 101, 101a, and 101b are as described above, and the descriptions thereof are omitted here.

Figure 14:
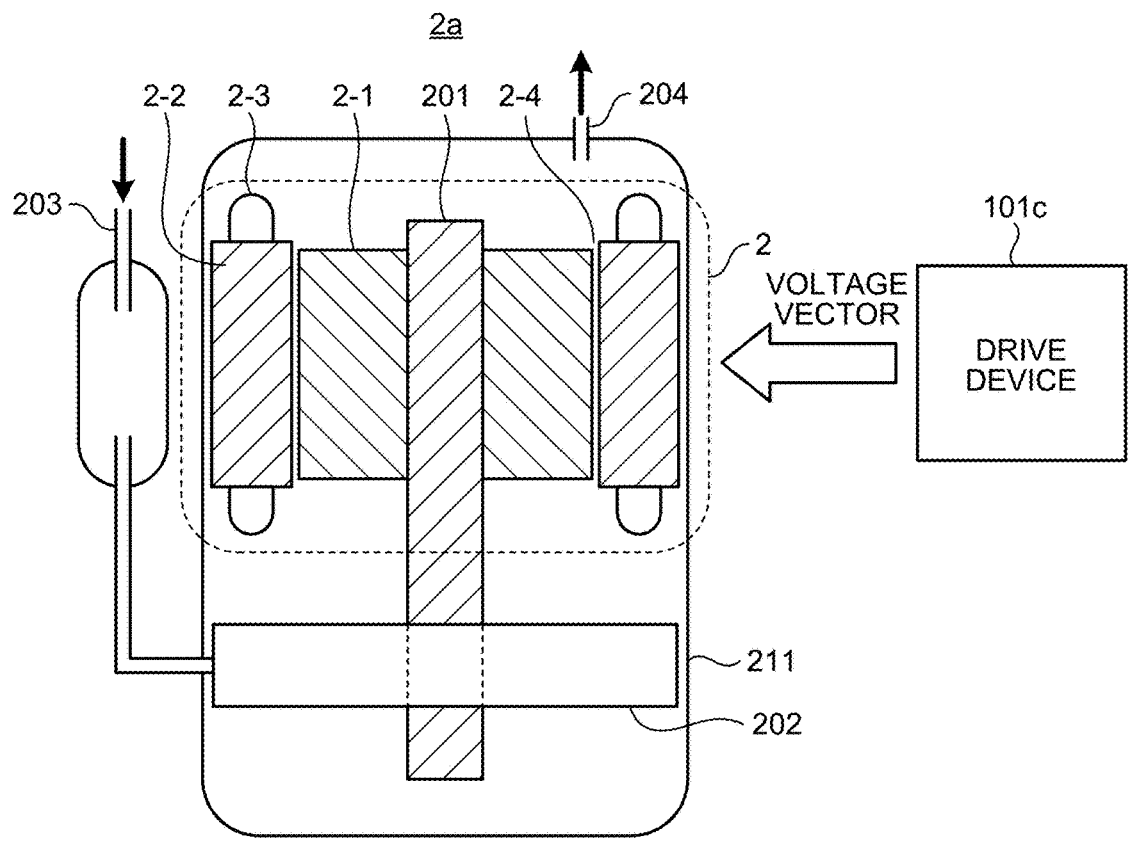
FIG. 14 is a cross-sectional view illustrating a schematic internal structure of the refrigerant compressor illustrated as the object to be driven in FIG. 13.
Figure 15:
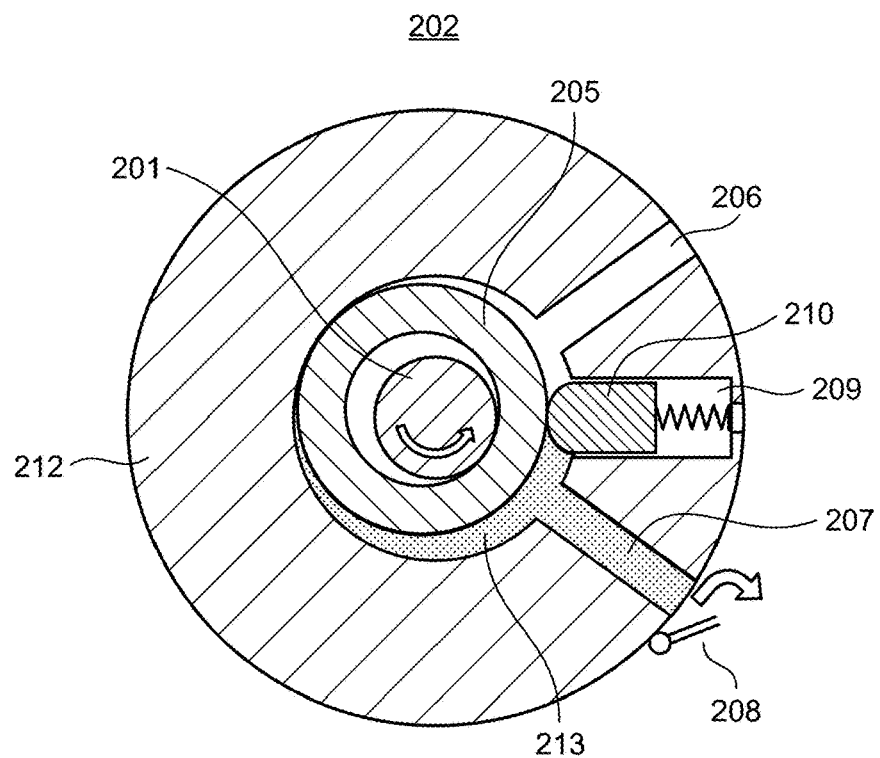
FIG. 15 is a cross-sectional view illustrating an internal structure of the compression unit of the refrigerant compressor illustrated in FIG. 14.

Next, the structure of the refrigerant compressor 20 and the load torque in the refrigerant compressor 20 will be described in detail with reference to FIGS. 14 and 15. FIG. 14 is a cross-sectional view illustrating a schematic internal structure of the refrigerant compressor 20 illustrated as the object to be driven in FIG. 13. FIG. 15 is a cross-sectional view illustrating an internal structure of a compression unit 202 of the refrigerant compressor 20 illustrated in FIG. 14. The refrigerant compressor described here is what is called a rolling-piston rotary compressor, which is only an example. The refrigerant compressor may be a different type of compressor such as a scroll compressor.

The refrigerant compressor 20 includes a sealed container 211, the AC motor 2 incorporated in the sealed container 211, a shaft 201 having one end passing through a rotor 2-1 constituting the AC motor 2, the compression unit 202 having the other end of the shaft 201 passing therethrough and fixed inside the sealed container 211, a suction pipe 203 provided in the sealed container 211, and a discharge pipe 204 provided in the sealed container 211.

A stator 2-2 of the AC motor 2 is attached to and held by the sealed container 211 through shrink fitting, cold fitting, or welding. Power is supplied to a coil 2-3 of the stator 2-2 via an electric wire (not illustrated). The rotor 2-1 is placed inside the stator 2-2 with a gap 2-4 interposed therebetween, and is rotatably held by a bearing (not illustrated) via the shaft 201 at the center of the rotor 2-1.

In the refrigerant compressor 20 thus configured, as the AC motor 2 is driven, the refrigerant sucked into the compression unit 202 via the suction pipe 203 is compressed, and the compressed refrigerant is discharged from the discharge pipe 204. The refrigerant compressor 20 often has a structure in which the AC motor 2 is immersed in the refrigerant and thus undergoes drastic temperature changes; therefore, it is difficult to attach a position sensor to the AC motor 2. Thus, in the refrigerant compressor 20, the AC motor 2 must be driven in a position-sensorless manner.

As illustrated in FIG. 15, the compression unit 202 includes an annular cylinder 212, a piston 205 formed rotatably and integrally with the shaft 201 and placed inside the cylinder 212, and a compression chamber 213 provided in an inner circumferential portion of the cylinder 212.

The cylinder 212 includes a suction port 206 communicating with the suction pipe 203 illustrated in FIG. 13 and a discharge port 207 through which the compressed refrigerant is discharged. The suction port 206 and the discharge port 207 communicate with the compression chamber 213. The cylinder 212 also includes a vane 210 that partitions the compression chamber 213 into a low-pressure chamber communicating with the suction pipe 203 and a high-pressure chamber communicating with the discharge port 207, and a spring 209 that biases the vane 210.

The shaft 201 connects the AC motor 2 and the piston 205 to each other. The piston 205 is eccentric so that the volumes on the discharge side and the suction side vary depending on the rotation angle. The refrigerant sucked through the suction port 206 is compressed by the piston 205, and when the pressure in the compression chamber 213 increases, a discharge valve 208 is opened, and the refrigerant is discharged through the discharge port 207. At the same time as the refrigerant is discharged, the refrigerant flows into the suction side. As the AC motor 2 is continuously rotated, the refrigerant is discharged once per mechanical angle rotation of the piston 205.

Load torque pulsations in the refrigerant compressor 20 are periodic disturbances for the AC motor 2, and thus cause speed pulsations. Regarding the refrigerant compressor 20, it is generally known that large speed pulsations lead to large noise and vibration.

However, the frequencies of load torque pulsations and speed pulsations are determined by the structure of the refrigerant compressor 20, and therefore are known. Using this, the refrigerant compressor 20 according to the third embodiment constructs the control system illustrated in FIG. 12. The refrigerant compressor 20 calculates, by means of the vibration suppression control unit 5 and the phase lead amount calculation unit 6, the second torque command $\tau^*_2$ with which a specific frequency component of speed pulsations is suppressed.

The pulsation pattern of the load torque of the refrigerant compressor 20 is determined by the mechanical structure of the refrigerant compressor. In a certain type of vibration suppression control, the pulsation pattern of the load torque is closely investigated in advance, and feedforward vibration suppression control is performed using the investigation data. However, in the feedforward type of vibration suppression control, preliminary investigation and control adjustment are extremely complicated.

General-purpose drive devices for AC motors are required to drive various types of mechanical devices including refrigerant compressors. The feedforward type of vibration suppression control with complicated pre-adjustment is not suitable for general-purpose drive devices. Therefore, the drive device 101c according to the fourth embodiment is configured using the feedback type of vibration suppression control so that vibration can be suppressed without performing preliminary investigation. In addition, because general-purpose drive devices are used in a wide variety of applications, it is difficult to significantly change the configuration of the adaptive observation unit as in the technique described in Patent Literature 1. This is because although any significant change in the configuration of the adaptive observation unit is liable to produce some trouble or bug, general-purpose drive devices require enormous man-hours for related impact investigation.

The drive device 101c according to the fourth embodiment has been devised under such circumstances. The drive device 101c according to the fourth embodiment is significantly advantageous in that it is possible to add the function of vibration suppression control to general-purpose drive devices without changing the configuration of the adaptive observation unit.

Fifth Embodiment

Figure 16:
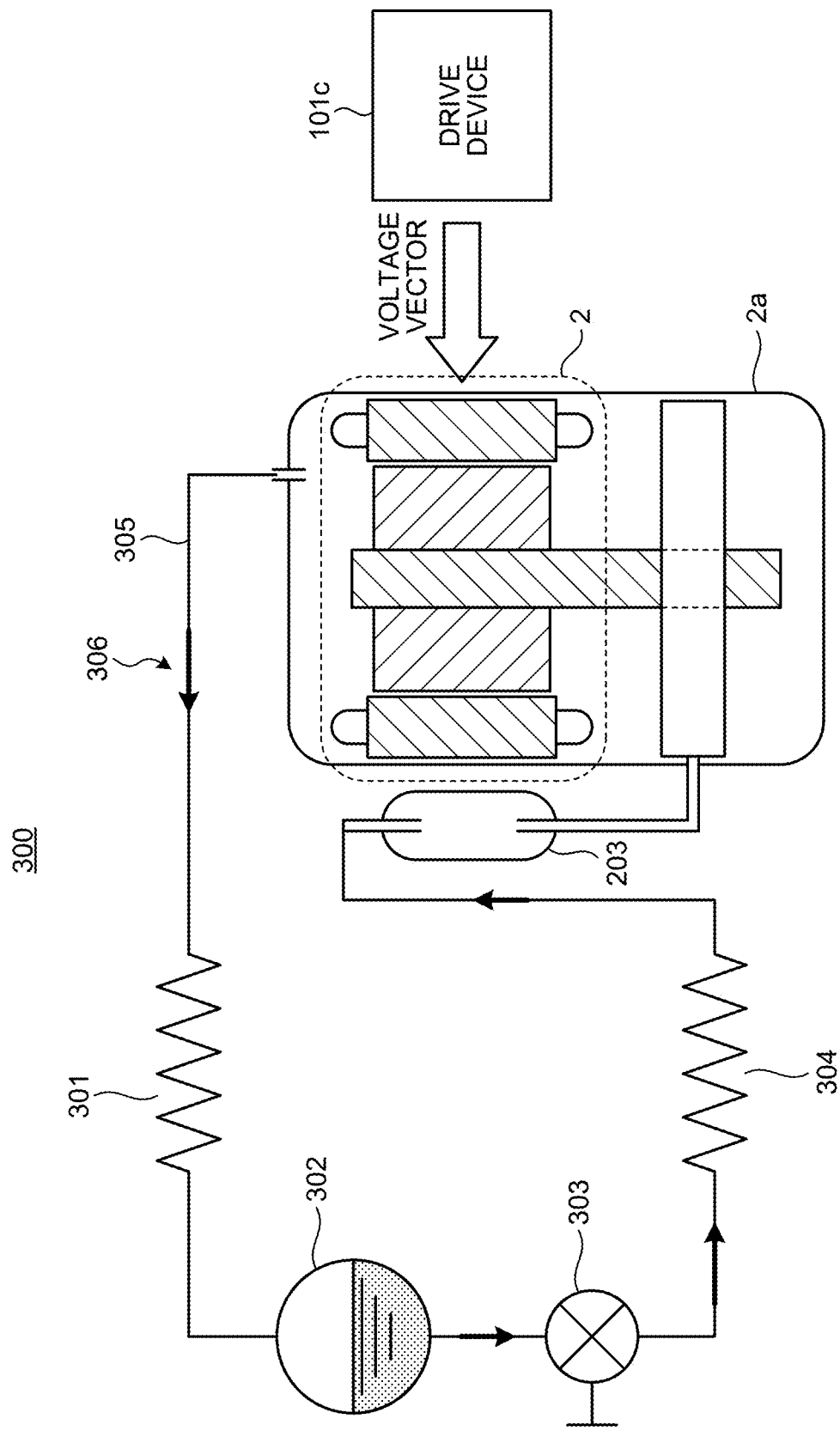
FIG. 16 is a diagram illustrating a configuration of a refrigeration cycle device according to a fifth embodiment.

FIG. 16 is a diagram illustrating a configuration of a refrigeration cycle device 300 according to the fifth embodiment. The refrigeration cycle device 300 illustrated in FIG. 16 includes the drive device 101c for an AC motor, the refrigerant compressor 20, a condenser 301 connected to the refrigerant compressor 20 via a pipe 305, a liquid receiver 302 connected to the condenser 301 via the pipe 305, an expansion valve 303 connected to the liquid receiver 302 via the pipe 305, and an evaporator 304 connected to the expansion valve 303 via the pipe 305. The evaporator 304 is connected to the suction pipe 203.

The refrigerant compressor 20, the condenser 301, the liquid receiver 302, the expansion valve 303, the evaporator 304, and the suction pipe 203 are connected by the pipe 305, whereby the refrigerant compressor 20, the condenser 301, the liquid receiver 302, the expansion valve 303, the evaporator 304, and the suction pipe 203 constitute a refrigeration cycle circuit 306 through which the refrigerant circulates. In the refrigeration cycle circuit 306, processes of evaporation, compression, condensation, and expansion of the refrigerant are repeated, in which heat is transferred as the refrigerant repeatedly changes from liquid to gas or from gas to liquid.

The functions of each device constituting the refrigeration cycle device 300 will be described. The evaporator 304 exerts a cooling action by evaporating the refrigerant liquid at low pressure and taking heat from the surroundings. The refrigerant compressor 20 compresses the refrigerant gas into a high-pressure gas in order to condense the refrigerant. The refrigerant compressor 20 is driven by the drive device 101c according to the fourth embodiment. The condenser 301 releases heat to condense the high-pressure refrigerant gas into a refrigerant liquid. The expansion valve 303 throttles and expands the refrigerant liquid into a low-pressure liquid in order to evaporate the refrigerant. The liquid receiver 302 is provided for adjusting the amount of circulating refrigerant, and may be omitted in a small device.

In general, quietness improvement and cost reduction are required of refrigeration cycle devices. For example, there is a particularly high demand for cost reduction in household refrigeration cycle devices, and single-rotary compressors are often used to meet this demand. A single-rotary compressor is a type of compressor including only one compression chamber 213, such as the rotary compressor described with reference to FIGS. 14 and 15. The rotary compressor has very large load torque pulsations, and thus tends to produce large vibration and noise. However, in the conventional feedforward control method, complicated control adjustment is required to suppress vibration and noise.

The refrigeration cycle device 300 according to the fifth embodiment performs feedback control such that the drive device 101c automatically mitigates speed pulsations to zero. This feedback type of vibration suppression control is significantly advantageous for general-purpose drive devices used in various applications. This is because vibration of various refrigerant compressors can be suppressed without preliminary adjustment.

As described above, whereas the technique described in Patent Literature 1 is difficult to apply to general-purpose drive devices, the method according to the present disclosure is significantly advantageous in facilitating the addition of the function of vibration suppression control to general-purpose drive devices. In addition, according to the fifth embodiment, by suppressing speed pulsations through feedback control, it is possible to flexibly cope with manufacturing variations, constant fluctuations in the motor, and changes in the load condition of the compressor. Consequently, the refrigeration cycle device 300 having high environmental resistance can be achieved.

The configurations described in the above-mentioned embodiments indicate examples. The embodiments can be combined with another well-known technique and with each other, and some of the configurations can be omitted or changed in a range not departing from the gist.

REFERENCE SIGNS LIST 1 adaptive observation unit; 2 AC motor; 2a rotor; 2-1 rotor; 2-2 stator; 2-3 coil; 2-4 gap; 3 speed control unit; 4, 4a torque control unit; 5, 5a, 5b, 5d, 5e, 5f, 5g vibration suppression control unit; 6, 6d, 6e, 6f, 6g phase lead amount calculation unit; 7 gain calculation unit; 11 model deviation calculation unit; 12 angular velocity estimation unit; 20 refrigerant compressor; 51, 51a, 51b speed pulsation calculator; 52, 53, 52a, 53a, 52b, 53b I controller; 54, 54a, 54b AC restorer; 101, 101a, 101b, 101c drive device; 201 shaft; 202 compression unit; 203 suction pipe; 204 discharge pipe; 205 piston; 206 suction port; 207 discharge port; 208 discharge valve; 209 spring; 210 vane; 211 sealed container; 212 cylinder; 213 compression chamber; 300 refrigeration cycle device; 301 condenser; 302 liquid receiver; 303 expansion valve; 304 evaporator; 305 pipe; 306 refrigeration cycle circuit; 801 voltage application unit; 802 current detection unit; 901 processor; 902 memory.

The invention claimed is:

1. A drive device for an AC motor, the drive device comprising:
an adaptive observer to adaptively estimate an angular velocity of a rotor of an AC motor that drives a mechanical device having periodic load torque pulsations;

a speed control circuitry to determine a first torque command with which an angular velocity command matches an average value of an estimated angular velocity;

a phase lead amount calculation circuitry to calculate, based on a disturbance frequency, a phase lead amount of a transfer function from a true angular velocity to a model deviation that is an internal quantity of the adaptive observer;

a vibration suppression controller to determine, based on a frequency of the load torque pulsations, the model deviation, and the phase lead amount, a second torque command with which speed pulsations in the AC motor are suppressed; and a torque control circuitry to control a torque of the AC motor based on the first torque command and the second torque command.

2. The drive device for an AC motor according to claim 1, wherein the vibration suppression controller includes:

a speed pulsation calculator to separately extract a cosine component and a sine component of a specific frequency component included in the model deviation;

two integral controllers to perform integral control such that each of the cosine component and the sine component becomes zero; and an AC restoration circuitry to restore an output of the integral controllers to an AC signal, and at least one of the speed pulsation calculator and the AC restoration circuitry performs calculation in which the phase lead amount is considered.

3. The drive device for an AC motor according to claim 2, comprising a gain calculation circuitry to calculate a gain characteristic of the transfer function, wherein the integral controllers perform control calculation by considering the gain characteristic.

4. The drive device for an AC motor according to claim 3, wherein a plurality of the vibration suppression controllers and a plurality of the phase lead amount calculation circuitries are provided, the phase lead amount calculation circuitries provided correspond one-to-one to the vibration suppression controllers, the plurality of vibration suppression controllers calculate torque commands based on different specific high-frequency components, and the torque control circuitry operates based on the torque commands output from the plurality of vibration suppression controllers.

5. A compressor drive device using the drive device for an AC motor according to claim 4.

6. A refrigeration cycle device using the compressor drive device according to claim 5.

7. A compressor drive device using the drive device for an AC motor according to claim 3.

8. A refrigeration cycle device using the compressor drive device according to claim 7.

9. The drive device for an AC motor according to claim 2, wherein a plurality of the vibration suppression controllers and a plurality of the phase lead amount calculation circuitries are provided, the phase lead amount calculation circuitries provided correspond one-to-one to the vibration suppression controllers, the plurality of vibration suppression controllers calculate torque commands based on different specific high-frequency components, and the torque control circuitry operates based on the torque commands output from the plurality of vibration suppression controllers.

10. A compressor drive device using the drive device for an AC motor according to claim 9.

11. A refrigeration cycle device using the compressor drive device according to claim 10.

12. A compressor drive device using the drive device for an AC motor according to claim 2.

13. A refrigeration cycle device using the compressor drive device according to claim 12.

14. The drive device for an AC motor according to claim 1, wherein a plurality of the vibration suppression controllers and a plurality of the phase lead amount calculation circuitries are provided, the phase lead amount calculation circuitries provided correspond one-to-one to the vibration suppression controllers, the plurality of vibration suppression controllers calculate torque commands based on different specific high-frequency components, and the torque control circuitry operates based on the torque commands output from the plurality of vibration suppression controllers.

15. A compressor drive device using the drive device for an AC motor according to claim 14.

16. A refrigeration cycle device using the compressor drive device according to claim 15.

17. A compressor drive device using the drive device for an AC motor according to claim 1.

18. A refrigeration cycle device using the compressor drive device according to claim 17.

* * * * *